United States Patent
Abotabl et al.

(10) Patent No.: US 12,323,916 B2
(45) Date of Patent: Jun. 3, 2025

(54) ENERGY SAVING MODE PATTERNS

(71) Applicant: QUALCOMM Incorporated, San Diego, CA (US)

(72) Inventors: Ahmed Attia Abotabl, San Diego, CA (US); Hung Dinh Ly, San Diego, CA (US); Yu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 17/877,570

(22) Filed: Jul. 29, 2022

(65) Prior Publication Data

US 2024/0040503 A1    Feb. 1, 2024

(51) Int. Cl.
*H04W 52/02* (2009.01)

(52) U.S. Cl.
CPC ................ *H04W 52/0216* (2013.01)

(58) Field of Classification Search
CPC ............ H04W 52/02; H04W 52/0216; H04W 52/029; H04W 52/30; H04W 52/32; H04W 52/322; H04W 52/325; H04W 52/327; H04W 52/34
USPC ........................................................ 370/311
See application file for complete search history.

(56) References Cited

U.S. PATENT DOCUMENTS

| | | | | |
|---|---|---|---|---|
| 9,100,964 B2* | 8/2015 | Fong | ..................... | H04L 5/0057 |
| 2014/0247780 A1* | 9/2014 | Jafarian | ............ | H04W 52/0216 |
| | | | | 370/329 |
| 2015/0201404 A1* | 7/2015 | Han | ..................... | H04W 72/23 |
| | | | | 370/329 |
| 2015/0208400 A1* | 7/2015 | Li | ......................... | H04W 72/20 |
| | | | | 370/329 |
| 2015/0365894 A1* | 12/2015 | Bai | ....................... | H04L 1/1854 |
| | | | | 370/311 |
| 2019/0090233 A1* | 3/2019 | Fong | .................... | H04L 5/0057 |
| 2021/0007139 A1* | 1/2021 | Fu | ........................ | H04L 5/0053 |
| 2022/0103247 A1* | 3/2022 | Abedini | .............. | H04B 7/2041 |
| 2022/0104260 A1* | 3/2022 | Wang | ................... | H04W 72/20 |
| 2022/0117030 A1* | 4/2022 | Shelby | ................. | H04W 76/28 |
| 2022/0400469 A1* | 12/2022 | Li | .................... | H04W 74/0808 |
| 2023/0142741 A1* | 5/2023 | Xiang | ................. | F16D 43/2028 |
| | | | | 192/32 |
| 2023/0194649 A1* | 6/2023 | Thomas | ............... | G01S 5/0246 |
| | | | | 370/252 |
| 2023/0292273 A1* | 9/2023 | Zhang | ............... | H04W 56/0045 |
| 2023/0413209 A1* | 12/2023 | Abotabl | ............... | H04W 24/10 |

(Continued)

*Primary Examiner* — Jean A Gelin
(74) *Attorney, Agent, or Firm* — Kevin M. Donnelly; Holland & Hart LLP

(57) ABSTRACT

Methods, systems, and devices for wireless communications at a user equipment (UE) are described. The UE may receive first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The UE may receive second control signaling scheduling one or more data signals to be communicated between the UE and the network entity during a scheduled duration that at least partially overlaps with at least one of the one or more durations. The UE may communicate the one or more data signals during the scheduled duration in accordance with the energy saving mode pattern.

30 Claims, 16 Drawing Sheets

(56) References Cited

U.S. PATENT DOCUMENTS

2024/0014890 A1* 1/2024 Beale ................. H04B 7/18519
2024/0236843 A1* 7/2024 Catovic ............. H04B 7/18513

* cited by examiner

ENERGY SAVING MODE PATTERNS

TECHNICAL FIELD

The following relates to wireless communications at a user equipment (UE), including energy saving mode patterns.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, operation of the network may involve substantial energy costs, among other constraints. A wireless communications device (such as a network entity) may engage in energy saving procedures. In some examples, such procedures may include the use of power modes or sleep modes in which a network entity may reduce performance of some operations (for example, reducing operation of one or more radio frequency (RF) chains) to save power while still maintaining network operation, among other aspects. However, such other different approaches may be improved.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication at a user equipment (UE). The method includes receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots, receiving second control signaling scheduling one or more data signals to be communicated between the UE and the network entity during a scheduled duration that at least partially overlaps with at least one of the one or more durations; and communicating the one or more data signals during the scheduled duration in accordance with the energy saving mode pattern.

Another innovative aspect of the subject matter described in this disclosure can be implemented in a method for wireless communication at a network entity. The method includes transmitting first control signaling indicating an energy saving mode pattern of energy saving modes that identify one or more energy saving modes of a network entity and one or more respective durations over which the network entity is to operate in the energy saving modes for transmissions in a plurality of slots, the energy saving mode pattern based at least in part on one or more slot types of the plurality of slots, transmitting second control signaling scheduling one or more data signals to be communicated between a UE and the network entity during a scheduled duration that at least partially overlaps with at least one of the one or more durations, and communicating the one or more data signals during the scheduled duration in accordance with the energy saving mode pattern.

Another innovative aspect of the subject matter described in this disclosure can be implemented in an apparatus for wireless communications at a UE. The apparatus may include a processor and memory coupled with the processor and storing instructions executable by the processor to cause the apparatus to receive first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots; receive second control signaling scheduling one or more data signals to be communicated between a user equipment (UE) and the network entity during a scheduled duration that at least partially overlaps with at least one of the one or more durations; and communicate the one or more data signals during the scheduled duration in accordance with the energy saving mode pattern.

Another innovative aspect of the subject matter described in this disclosure can be implemented in an apparatus for wireless communications at a network entity. The apparatus may include a processor and memory coupled with the processor and storing instructions executable by the processor to cause the apparatus to transmit first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots; transmit second control signaling scheduling one or more data signals to be communicated between a user equipment (UE) and the network entity during a scheduled duration that at least partially overlaps with at least one of the one or more durations; and communicate the one or more data signals during the scheduled duration in accordance with the energy saving mode pattern.

Some examples of the method, apparatuses, and non-transitory computer-readable medium described herein may further include operations, features, means, or instructions for receiving the first control signaling that includes receiving a first energy saving mode subpattern of one or more first energy saving modes of the energy saving modes and one or more respective first durations over which the network entity is to operate in the one or more first energy saving modes for downlink transmissions, and receiving a second energy saving mode subpattern including one or more second energy saving modes of the energy saving modes and one or more respective second durations over which the network entity is to operate in the one or more second energy saving modes for uplink transmissions. In some examples, communicating the one or more data signals includes communicating the one or more data signals in accordance with the first energy saving mode subpattern, the second energy saving mode subpattern, or both, based at least in part on the one or more data signals being downlink signals, uplink signals, or any combination thereof.

Some examples of the method, apparatuses, and non-transitory computer-readable medium described herein may further include operations, features, means, or instructions for transmitting the first control signaling that includes receiving a first energy saving mode subpattern of one or more first energy saving modes of the energy saving modes and one or more respective first durations over which the network entity is to operate in the one or more first energy saving modes for downlink transmissions, and transmitting a second energy saving mode subpattern including one or more second energy saving modes of the energy saving modes and one or more respective second durations over which the network entity is to operate in the one or more second energy saving modes for uplink transmissions. In some examples, communicating the one or more data signals includes communicating the one or more data signals in accordance with the first energy saving mode subpattern, the second energy saving mode subpattern, or both, based at least in part on the one or more data signals being downlink signals, uplink signals, or any combination thereof.

DETAILED DESCRIPTION

Figure 1:
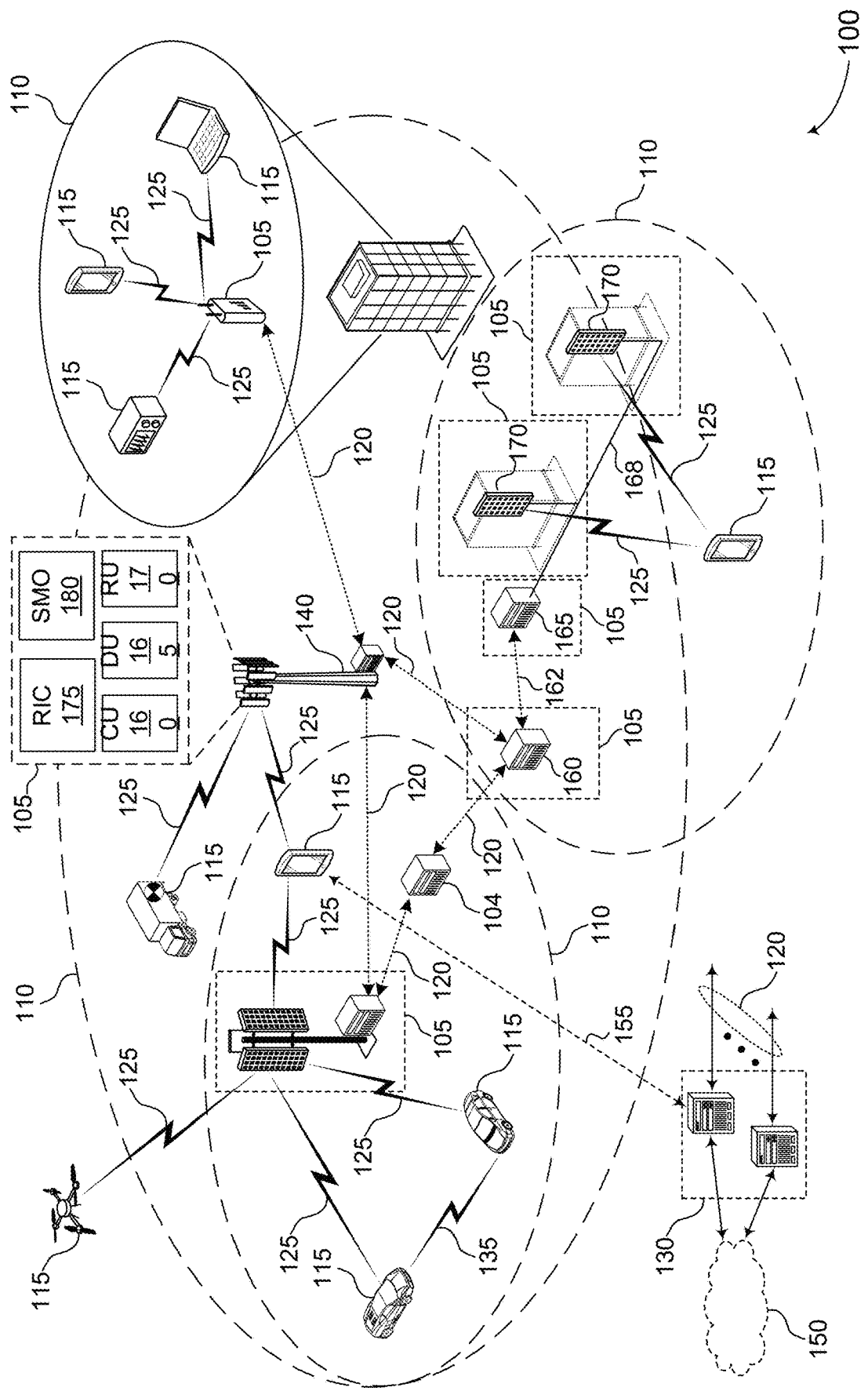
FIG. 1 illustrates an example of a wireless communications system that supports energy saving mode patterns in accordance with one or more aspects of the present disclosure.

During wireless communications, network entities may consume significant power. Network energy saving features may aid in reducing such power consumption. For example, a network entity may communicate using different modes that may be associated with different levels of power consumption due to different operation configurations. For example, such operation configurations may involve turning off one or more radio frequency (RF) transmission chains, reducing a number of antennas for communications, or other operations. Such modes of operation for power conservation may be referred to as network energy saving (NES) modes. Network entities may be capable of utilizing NES modes with a variety of operation configurations or characteristics and resulting power savings. However, some approaches to wireless communications do not provide for flexible scheduling or notification of the use of such NES modes by the network entities so that other wireless devices may also accommodate the use of the NES modes.

Various aspects generally relate to power saving operations, and more specifically, to signaling and use of different network-side NES mode patterns or subpatterns for different slot types (for example, uplink slots, downlink slots, flexible slots, or full-duplex slots). For example, a network entity and a user equipment (UE) may communicate using one or more patterns of NES modes and such a pattern may include a sequence of NES power modes, each associated with respective durations, and transitions between such NES power modes, which may also involve associated durations. The UE may be aware of the different NES modes and may make corresponding adjustments to communications operations. In some examples, the network entity and the UE may use different NES modes for downlink transmissions and uplink transmissions (for example, in time domain duplexing (TDD) operation or, in some cases, frequency domain duplexing (FDD) operation). To inform the UE of such different NES modes, the network entity may transmit multiple corresponding subpatterns for downlink transmissions, uplink transmissions, or both, indicating the various NES modes that the network entity and UE are to use. In some examples, the NES modes of an NES pattern may be configured based on the slot type of the slot in which the NES modes are to be applied. For example, a downlink slot may be configured for one energy saving mode and an uplink slot may be configured for another energy saving mode. In some examples, a downlink NES subpattern and an uplink NES subpattern may completely overlap (for example, the downlink and uplink NES patterns may begin in the same slot and end in the same slot) or they may partially overlap (for example, the beginning of the uplink NES pattern may occur after the beginning of the downlink NES pattern but before the end of the downlink NES pattern). Further, some NES patterns may indicate a flexible NES mode that may be configured dynamically through additional subsequent signaling from the network entity.

Particular aspects of the subject matter described in this disclosure may be implemented to realize one or more of the following potential advantages. The techniques employed by the described communication devices may provide benefits and enhancements to the use of NES modes at a network entity and corresponding UE operation. For example, by employing different NES modes for different slot types (such as uplink slots, downlink slots, or full-duplex slots), the network entity may reduce power consumption because of applying different energy saving approaches that may be better suited for the various slot types. Further, by signaling indications of such NES modes to the UE, the network entity may maintain effective communications while consuming less power, as the UE is aware of the different NES modes and may make corresponding adjustments to communications operations.

Aspects of the disclosure are initially described in the context of wireless communications systems. Aspects of the disclosure are then described in the context of a wireless communications system, example NES schemes, and a process flow. Aspects of the disclosure are further illustrated by and described with reference to apparatus diagrams, system diagrams, and flowcharts that relate to energy saving mode patterns.

FIG. 1 illustrates an example of a wireless communications system 100 that supports energy saving mode patterns in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (for example, a radio frequency (RF) access link). For example, a network entity 105 may support a coverage area 110 (for example, a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (for example, any network entity described herein), a UE 115 (for example, any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (for example, in accordance with an S1, N2, N3, or other interface protocol). In some examples, network entities 105 may communicate with one another via a backhaul communication link 120 (for example, in accordance with an X2, Xn, or other interface protocol) either directly (for example, directly between network entities 105) or indirectly (for example, via a core network 130). In some examples, network entities 105 may communicate with one another via a midhaul communication link 162 (for example, in accordance with a midhaul interface protocol) or a fronthaul communication link 168 (for example, in accordance with a fronthaul interface protocol), or any combination thereof. The backhaul communication links 120, midhaul communication links 162, or fronthaul communication links 168 may be or include one or more wired links (for example, an electrical link, an optical fiber link), one or more wireless links (for example, a radio link, a wireless optical link), among other examples or various combinations thereof. A UE 115 may communicate with the core network 130 via a communication link 155.

One or more of the network entities 105 described herein may include or may be referred to as a base station 140 (for example, a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (for example, a base station 140) may be implemented in an aggregated (for example, monolithic, standalone) base station architecture, which may be configured to utilize a protocol stack that is physically or logically integrated within a single network entity 105 (for example, a single RAN node, such as a base station 140).

In some examples, a network entity 105 may be implemented in a disaggregated architecture (for example, a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (for example, a network configuration sponsored by the O-RAN Alliance), or a virtualized RAN (vRAN) (for example, a cloud RAN (C-RAN)). For example, a network entity 105 may include one or more of a central unit (CU) 160, a distributed unit (DU) 165, a radio unit (RU) 170, a RAN Intelligent Controller (MC) 175 (for example, a Near-Real Time MC (Near-RT MC), a Non-Real Time MC (Non-RT MC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (for example, separate physical locations). In some examples, one or more network entities 105 of a disaggregated RAN architecture may be implemented as virtual units (for example, a virtual CU (VCU), a virtual DU (VDU), a virtual RU (VRU)).

The split of functionality between a CU 160, a DU 165, and an RU 170 is flexible and may support different functionalities depending on which functions (for example, network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (for example, layer 3 (L3), layer 2 (L2)) functionality and signaling (for example, Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (for example, physical (PHY) layer) or L2 (for example, radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (for example, via one or more RUs 170). In some cases, a functional split between a CU 160 and a DU 165, or between a DU 165 and an RU 170 may be within a protocol layer (for example, some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (for example, F1, F1-c, F1-u), and a DU 165 may be connected to one or more RUs 170 via a fronthaul communication link 168 (for example, open fronthaul (FH) interface). In some examples, a midhaul communication link 162 or a fronthaul communication link 168 may be implemented in accordance with an interface (for example, a channel) between layers of a protocol stack supported by respective network entities 105 that are in communication via such communication links.

In wireless communications systems (for example, wireless communications system 100), infrastructure and spectral resources for radio access may support wireless backhaul link capabilities to supplement wired backhaul connections, providing an IAB network architecture (for example, to a core network 130). In some cases, in an IAB network, one or more network entities 105 (for example, IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (for example, a donor base station 140). The one or more donor network entities 105 (for example, IAB donors) may be in communication with one or more additional network entities 105 (for example, IAB nodes 104) via supported access and backhaul links (for example, backhaul communication links 120). IAB nodes 104 may include an IAB mobile termination (IAB-MT) controlled (for example, scheduled) by DUs 165 of a coupled IAB donor. An IAB-MT may include an independent set of antennas for relay of communications with UEs 115, or may share the same antennas (for example, of an RU 170) of an IAB node 104 used for access via the DU 165 of the IAB node 104 (for example, referred to as virtual IAB-MT (vIAB-MT)). In some examples, the IAB nodes 104 may include DUs 165 that support communication links with additional entities (for example, IAB nodes 104, UEs 115) within the relay chain or configuration of the access network (for example, downstream). In such cases, one or more components of the disaggregated RAN architecture (for example, one or more IAB nodes 104 or components of IAB nodes 104) may be configured to operate according to the techniques described herein.

For instance, an access network (AN) or RAN may include communications between access nodes (for example, an IAB donor), IAB nodes 104, and one or more UEs 115. The IAB donor may facilitate connection between the core network 130 and the AN (for example, via a wired or wireless connection to the core network 130). That is, an IAB donor may refer to a RAN node with a wired or wireless connection to core network 130. The IAB donor may include a CU 160 and at least one DU 165 (for example, and RU 170), in which case the CU 160 may communicate with the core network 130 via an interface (for example, a backhaul link). IAB donor and IAB nodes 104 may communicate via an F1 interface according to a protocol that defines signaling messages (for example, an F1 AP protocol). Additionally, or alternatively, the CU 160 may communicate with the core network via an interface, which may be an example of a portion of backhaul link, and may communicate with other CUs 160 (for example, a CU 160 associated with an alternative IAB donor) via an Xn-C interface, which may be an example of a portion of a backhaul link.

An IAB node 104 may refer to a RAN node that provides IAB functionality (for example, access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (for example, an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (for example, DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (for example, a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (for example, transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support energy saving mode patterns as described herein. For example, some operations described as being performed by a UE 115 or a network entity 105 (for example, a base station 140) may additionally, or alternatively, be performed by one or more components of the disaggregated RAN architecture (for example, IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (for example, an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (for example, entity, sub-entity) of a network entity 105. For example, the terms "transmitting," "receiving," or "communicating," when referring to a network entity 105, may refer to any portion of a network entity 105 (for example, a base station 140, a CU 160, a DU 165, a RU 170) of a RAN communicating with another device (for example, directly or via one or more other network entities 105).

In some examples, such as in a carrier aggregation configuration, a carrier may also have acquisition signaling or control signaling that coordinates operations for other carriers. A carrier may be associated with a frequency channel (for example, an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (for example, of the same or a different radio access technology).

The communication links 125 shown in the wireless communications system 100 may include downlink transmissions (for example, forward link transmissions) from a network entity 105 to a UE 115, uplink transmissions (for example, return link transmissions) from a UE 115 to a network entity 105, or both, among other configurations of transmissions. Carriers may carry downlink or uplink communications (for example, in an FDD mode) or may be configured to carry downlink and uplink communications (for example, in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (for example, 1.4, 3, 5, 10, 15, 20, 40, or 80 megahertz (MHz)). Devices of the wireless communications system 100 (for example, the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (for example, a sub-band, a BWP) or all of a carrier bandwidth.

Signal waveforms transmitted via a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (for example, a duration of one modulation symbol) and one subcarrier, in which case the symbol period and subcarrier spacing may be inversely related. The quantity of bits carried by each resource element may depend on the modulation scheme (for example, the order of the modulation scheme, the coding rate of the modulation scheme, or both), such that a relatively higher quantity of resource elements (for example, in a transmission duration) and a relatively higher order of a modulation scheme may correspond to a relatively higher rate of communication. A wireless communications resource may refer to a combination of an RF spectrum resource, a time resource, and a spatial resource (for example, a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively-numbered subframes or slots, and each subframe or slot may have the same duration. In some examples, a frame may be divided (for example, in the time domain) into subframes, and each subframe may be further divided into a quantity of slots. Alternatively, each frame may include a variable quantity of slots, and the quantity of slots may depend on subcarrier spacing. Each slot may include a quantity of symbol periods (for example, depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, a quantity of symbol periods in a TTI) may be variable. Additionally, or alternatively, the smallest scheduling unit of the wireless communications system 100 may be dynamically selected (for example, in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a set of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (for example, using a carrier) and may be associated with an identifier for distinguishing neighboring cells (for example, a physical cell identifier (PCID), a virtual cell identifier (VCID), or others). In some examples, a cell also may refer to a coverage area 110 or a portion of a coverage area 110 (for example, a sector) over which the logical communication entity operates. Such cells may range from smaller areas (for example, a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered network entity 105 (for example, a lower-powered base station 140), as compared with a macro cell, and a small cell may operate using the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a network entity 105 (for example, a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (for example, base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a network entity 105 (for example, a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (for example, in accordance with a peer-to-peer (P2P), D2D, or sidelink protocol). In some examples, one or more UEs 115 of a group that are performing D2D communications may be within the coverage area 110 of a network entity 105 (for example, a base station 140, an RU 170), which may support aspects of such D2D communications being configured by (for example, scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (for example, base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (for example, less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (for example, from 30 GHz to 300 GHz), also known as the millimeter band. In some examples, the wireless communications system 100 may support millimeter wave (mmW) communications between the UEs 115 and the network entities 105 (for example, base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (for example, LAA). Operations using unlicensed spectrum may include downlink transmissions, uplink transmissions, P2P transmissions, or D2D transmissions, among other examples.

A network entity 105 (for example, a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (for example, the same codeword) or different data streams (for example, different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (for example, a network entity 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A network entity 105 or a UE 115 may use beam sweeping techniques as part of beamforming operations. For example, a network entity 105 (for example, a base station 140, an RU 170) may use multiple antennas or antenna arrays (for example, antenna panels) to conduct beamforming operations for directional communications with a UE 115. Some signals (for example, synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (for example, by a transmitting device, such as a network entity 105, or by a receiving device, such as a UE 115) a beam direction for later transmission or reception by the network entity 105.

Some signals, such as data signals associated with a particular receiving device, may be transmitted by transmitting device (for example, a transmitting network entity 105, a transmitting UE 115) along a single beam direction (for example, a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (for example, by a network entity 105 or a UE 115) may be performed using multiple beam directions, and the device may use a combination of digital precoding or beamforming to generate a combined beam for transmission (for example, from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted along one or more directions by a network entity 105 (for example, a base station 140, an RU 170), a UE 115 may employ similar techniques for transmitting signals multiple times along different directions (for example, for identifying a beam direction for subsequent transmission or reception by the UE 115) or for transmitting a signal along a single direction (for example, for transmitting data to a receiving device).

A receiving device (for example, a UE 115) may perform reception operations in accordance with multiple receive configurations (for example, directional listening) when receiving various signals from a receiving device (for example, a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned along a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (for example, a communication link 125, a D2D communication link 135). HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 and a network entity 105 may support the use of NES mode patterns that the network entity 105 may transmit to the UE 115. For example, the network entity 105 may use various NES modes to reduce power consumption while maintaining network operation. The network entity 105 may transmit indications of the various NES modes that it will use to the UE 115 so that the UE may take the NES modes into account for communications operations. In some examples, the network entity 105 may use different NES modes for different slot types, such as downlink slots, uplink slots, or full-duplex slots. In some examples, the different NES modes may be organized into subpatterns for the different slot types, and the subpatterns may either partially or completely overlap in time.

Figure 2:
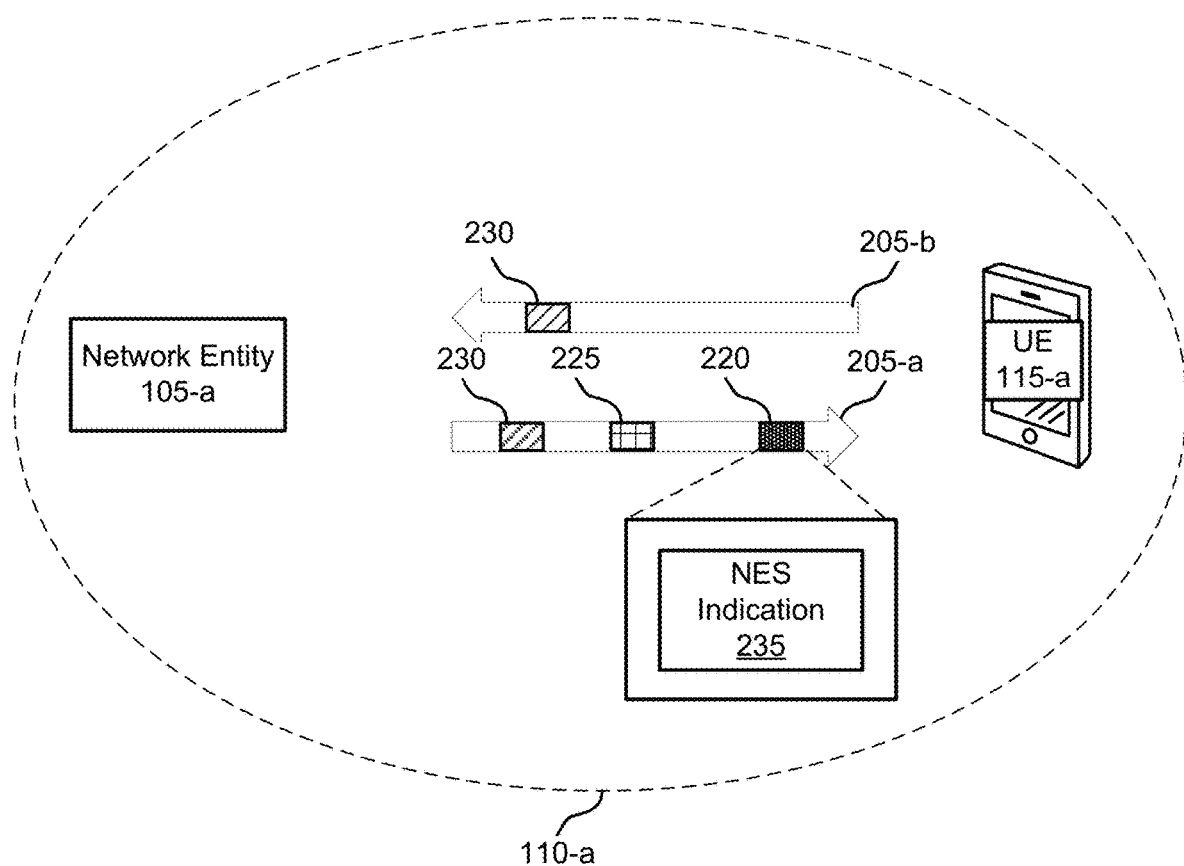
FIG. 2 illustrates an example of a wireless communications system that supports energy saving mode patterns in accordance with one or more aspects of the present disclosure.

FIG. 2 illustrates an example of a wireless communications system 200 that supports energy saving mode patterns in accordance with one or more aspects of the present disclosure. The wireless communications system 200 may involve the network entity 105-*a* that may be an examples of one or more network entities discussed in relation to other figures. The wireless communications system 200 may involve the UE 115-*b* that may be an example of UEs discussed in relation to other figures.

In some examples, the UE 115 *a* may be located in a geographic coverage area 110-*a* that may be associated with the network entity 105-*a*. The network entity 105-*a* and UE 115-*a* may communicate via one or more downlink communication links 205-*a* and one or more uplink communication links 205-*b*.

In the course of wireless communications, a network (such as a RAN) may incur significant energy consumption costs. For example, a RAN may account for a majority of energy costs for operating a wireless communications network. As such, the use of energy saving approaches may aid in the adoption and expansion of cellular networks.

In some examples, wireless communications systems may employ various energy savings modes (for example, NES modes) and techniques for network power saving and such energy savings modes may each involve one or more operations performed or not performed by the network to conserve energy. For example, a network entity may enter into a sleep mode, optionally based on an amount of traffic occurring in the system. Such sleep modes may be different in terms of operation. For example, some sleep modes may turn off an RF chains while others may not. Further, different sleep modes may have different levels of power consumption and may involve different transition times between sleep modes.

In some examples, various NESs may be employed in a periodic manner. For example, for a given period, a network entity may engage in a pattern of multiple NESs that may repeat for multiple periods. For example, the network entity may use a first NES for a given number of slots followed by a second NES for a given number of slots and a third NES for a given number of slots and the pattern of the first, second, and third NESs may repeat periodically.

In some examples, a NES may be a "flexible" NES that may not initially be associated with a power-saving operation. However, in some examples, one or more power saving operations may be dynamically indicated by a network entity (for example, depending on traffic conditions or other factors). Additionally or alternatively, a NES may be a mode of "normal" network operation (for example, a mode of operation in which only some or no power saving operations may be performed). Such a mode may also be referred to as a "legacy" mode or NES.

In some examples, the network entity may engage in different NES or power saving operations during a slot based on a type of the slot. For example, the network entity may engage in a power saving operation during one or more downlink slots but not during one or more uplink slots, since downlink slots may be associated with higher energy consumption compared to downlink slots. Stated more generally, the network entity may adopt different energy saving techniques for different slot types (for example, uplink slots, downlink slots, or full-duplex slots), which may affect the energy consumption of the network entity.

For example, while downlink communications may, in some cases, involve greater energy consumption by the network entity than uplink communications, such uplink communications may also be a source of energy consumption that may be reduced through the use of NESs.

In some examples, some power saving techniques or NESs may apply to only one slot type or type of communication, such as downlink communications. For example, the network entity may reduce transmit power for downlink communications, which may reduce power consumption. However, some techniques or NESs may apply in both downlink and uplink directions, such as reducing a quantity of antenna elements used for communications. In some such cases, the network entity may reduce the number of antenna elements used differently for uplink communications, downlink communications, and full-duplex communications.

In some examples, the network entity 105-a may transmit the first control signaling 220 to the UE 115-a. The first control signaling 220 may include one or more NES indications 235. As described herein, the NES indications 235 may include patterns of NESs that the network entity 105-a may use for communications with the UE 115-a during a period of time. The NES indications 235 may indicate associated durations during which the NESs may be used.

In some examples, the network entity 105-a may transmit the second control signaling 225 to the UE 115-a. the second control signaling 225 may schedule the one or more data communications 230 that are to be communicated between the network entity 105-a and the UE 115-a. The data communications 230 may be transmitted in durations that may at least overlap with at least one of the durations during which the NESs indicated in the NES indications 235 are to be used. In some examples, the network entity 105-a and the UE 115-a may then communicate the data communications 230 at the scheduled times and with the use of NESs that may align in time with the scheduled data communications 230.

Figure 3:
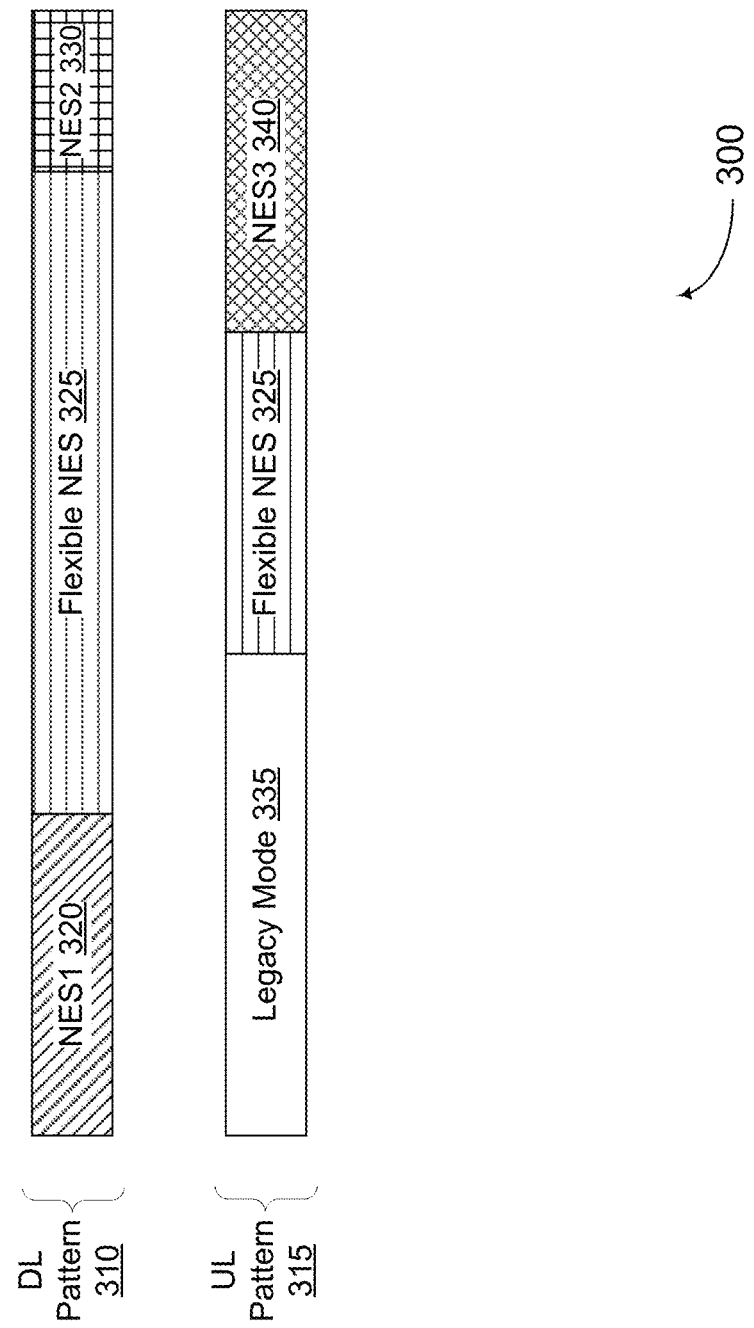
FIG. 3 illustrates an example of an NES scheme that supports energy saving mode patterns in accordance with one or more aspects of the present disclosure.

FIG. 3 illustrates an example of an NES scheme 300 that supports energy saving mode patterns in accordance with one or more aspects of the present disclosure. The NES scheme 300 may include one or more NESs in the DL pattern 310, the UL pattern 315, or both. For example, as depicted, the DL pattern 310 may include the NES1 320, the flexible NES 325, and the NES2 330. The UL pattern 315 may include the legacy mode 335, another flexible NES 325, and NES3 340.

In some examples, the network entity may indicate a pattern of network operations or NESs for each slot type, such as the DL pattern 310 and the UL pattern 315. For example, the network entity may indicate to the UE that the network entity will use a NES pattern for downlink slots and that operations for uplink slots may be performed without a NES (for example, in a legacy manner). In another example, the network entity may operate with a first quantity of antennas in downlink slots and operate with a second quantity of antennas in uplink slots. In some examples, one or more NESs or power savings operations may have a minimum time interval over which the NES or power savings operations are to be performed. Such a minimum time interval may be defined or indicated in an amount of time, a quantity of slots, a quantity of symbols, or a quantity of frames. Further, such a minimum time interval may be a function of or based on a subcarrier spacing that may be used during the time that the NESs or other power saving operations are to be used.

In some examples involving frequency domain duplexing, the network entity may transmit indications of multiple patterns or sequences of NESs that may be associated with different frequency bands. For example, the network entity may transmit the DL pattern 310 that is to be used in a first frequency band and the network entity may transmit the UL pattern 315 that is to be used in a second frequency band.

Though example patterns are depicted and discussed, different combinations of NESs, other operations or modes, or both, may be used. Additionally, though similar names or designations for NESs may be used for different slot types, it is to be understood that the operations may still differ. For example, the flexible NES 325 associated with the DL pattern 310 may involve different operations than the flexible NES 325 associated with the UL pattern 315. For example, the network entity may transmit signaling to the UE that may indicate one or more power saving operations or non-power saving operations that may be assigned or indicated for the flexible NES 325. Such indications may be dynamically signaled to the UE by the network entity and may further be based on one or more factors, including an amount or characteristic of traffic. Additionally or alternatively, even though the various NESs depicted may bear different labels or designations, it is to be understood that they may involve some or all of the same operations.

Figure 4:
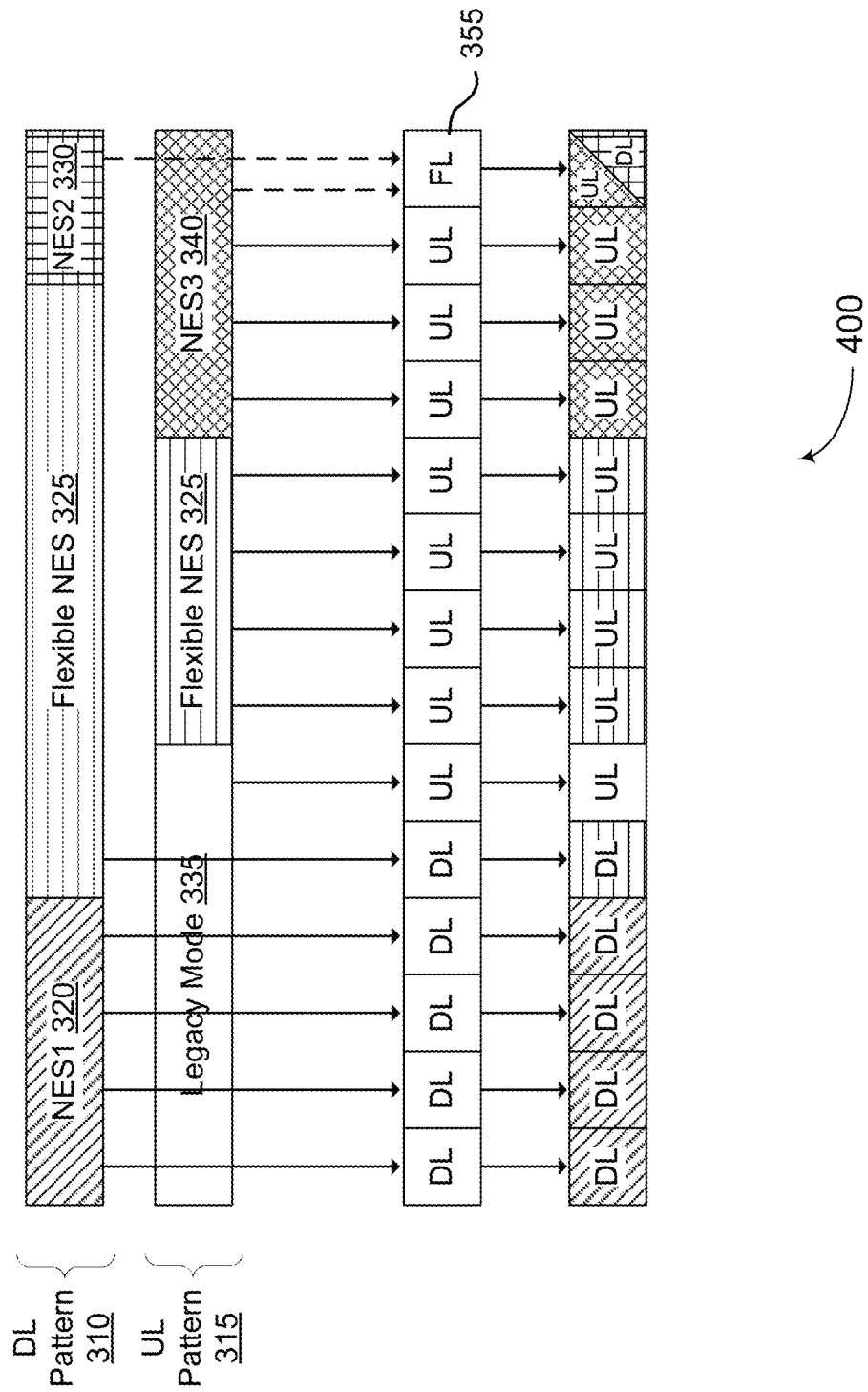
FIG. 4 illustrates an example of an NES scheme that supports energy saving mode patterns in accordance with one or more aspects of the present disclosure.

FIG. 4 illustrates an example of an NES scheme 400 that supports energy saving mode patterns in accordance with one or more aspects of the present disclosure. The NES scheme 400 may include one or more NESs in the DL pattern 410, the UL pattern 415, or both. For example, as depicted, the DL pattern 410 may include the NES1 320, the flexible NES 325, and the NES2 330. The UL pattern 415 may include the legacy mode 335, another flexible NES 325, and NES3 340.

In some examples, the network entity may signal the UL pattern 415 and the DL pattern 420. In some examples, the UL pattern 415 and the DL pattern 420 may be aligned in time. For example, they may be aligned with a time division duplexing format. However, the ultimate assignment or indication of which NES may be applied during a given slot may depend on the slot format. For example, for each downlink slot, the UE may apply the NES that aligns with the slot in time and appears in the DL pattern 410. For example, the first five slots may be downlink slots and may therefore be associated with the NES1 320 and the flexible NES 325 as shown in the figure. Similarly, for each uplink slot, the UE may apply the NES that aligns with the slot in time and appears in the UL pattern 415.

In some examples, the network entity may indicate a NES pattern for one direction or slot type (downlink, for example). Such an indication may be interpreted by the UE to apply the NESs indicated in the pattern for the one direction or slot type. For one or more other slot types (for example, uplink or full-duplex) the UE may apply "legacy" operation (for example, operation in which only some or no NES approaches are used). Additionally or alternatively, the UE may perform one or more "default" operations that may be preconfigured or designation in operation specifications.

In some examples, a slot may be assigned to be a flexible slot, such as flexible slot 355. Such a flexible slot 355 may be considered to be either a downlink slot, an uplink slot, or a full-duplex slot. In other words, the flexible slot 355 may eventually receive a designation of a slot type, and the UE may then treat the flexible slot according to the received designation of the slot type. For example, in examples in which the network entity designates the flexible slot 355 to be an uplink slot, then the UE would apply the NES that applies to the UL slot based on the UL pattern 415. More generally stated, the UE may consider the network energy saving state of the type of the slot that the flexible slot 355 assumes and treat it accordingly.

Figure 5:
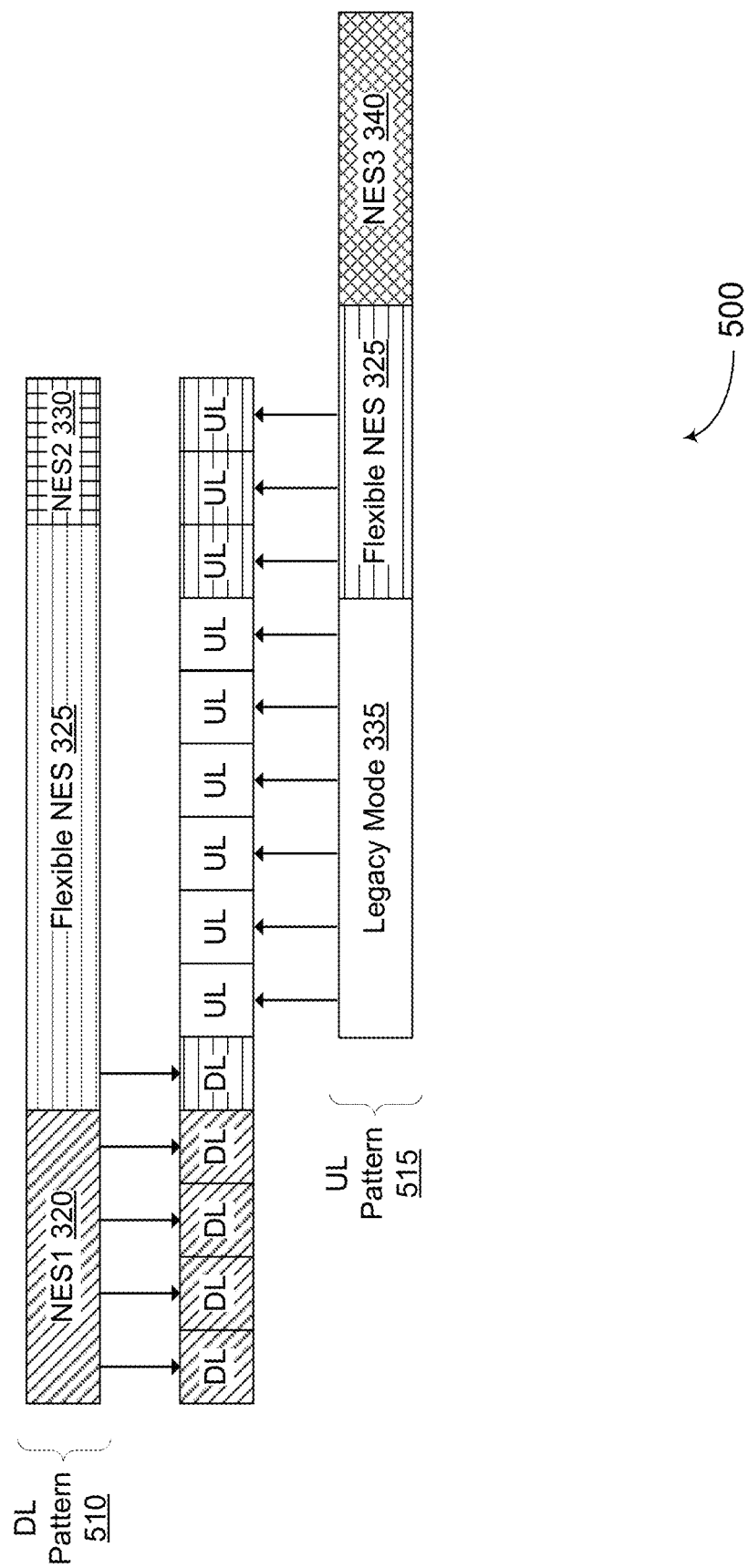
FIG. 5 illustrates an example of an NES scheme that supports energy saving mode patterns in accordance with one or more aspects of the present disclosure.

FIG. 5 illustrates an example of an NES scheme 500 that supports energy saving mode patterns in accordance with one or more aspects of the present disclosure. The NES scheme 500 may include one or more NESs in the DL pattern 510, the UL pattern 515, or both. For example, as depicted, the DL pattern 310 may include the NES1 320, the flexible NES 325, and the NES2 330. The UL pattern 315 may include the legacy mode 335, another flexible NES 325, and NES3 340.

In some examples (for example, instead of aligning the DL pattern 510 and the UL pattern 515), the DL pattern 510 may extend over all downlink slots and the UL pattern 515 may extend over all uplink slots. For example, the DL pattern 510 indicates that the NES1 320 for four slots, the flexible NES 325 for 8 slots and the NES2 330 for 2 slots. This means that the first 4 downlink slots will follow NES1 320 and the following 8 DL slots will follow flexible operation regardless of any UL slots in between. In other words, the order of NES1 assignments or designations may be indicated, but the exact timing (for example, slot numbering) may not be indicated by the patterns.

In some examples, the indicated patterns may not begin until a first slot of the corresponding type occurs. For example, the UL pattern 315 may not begin until the first UL slot (slot number 6 in the depicted example). Then, as described herein, the pattern may continue for any following uplink slots, regardless of whether any intervening slots of other types may be present.

Figure 6:
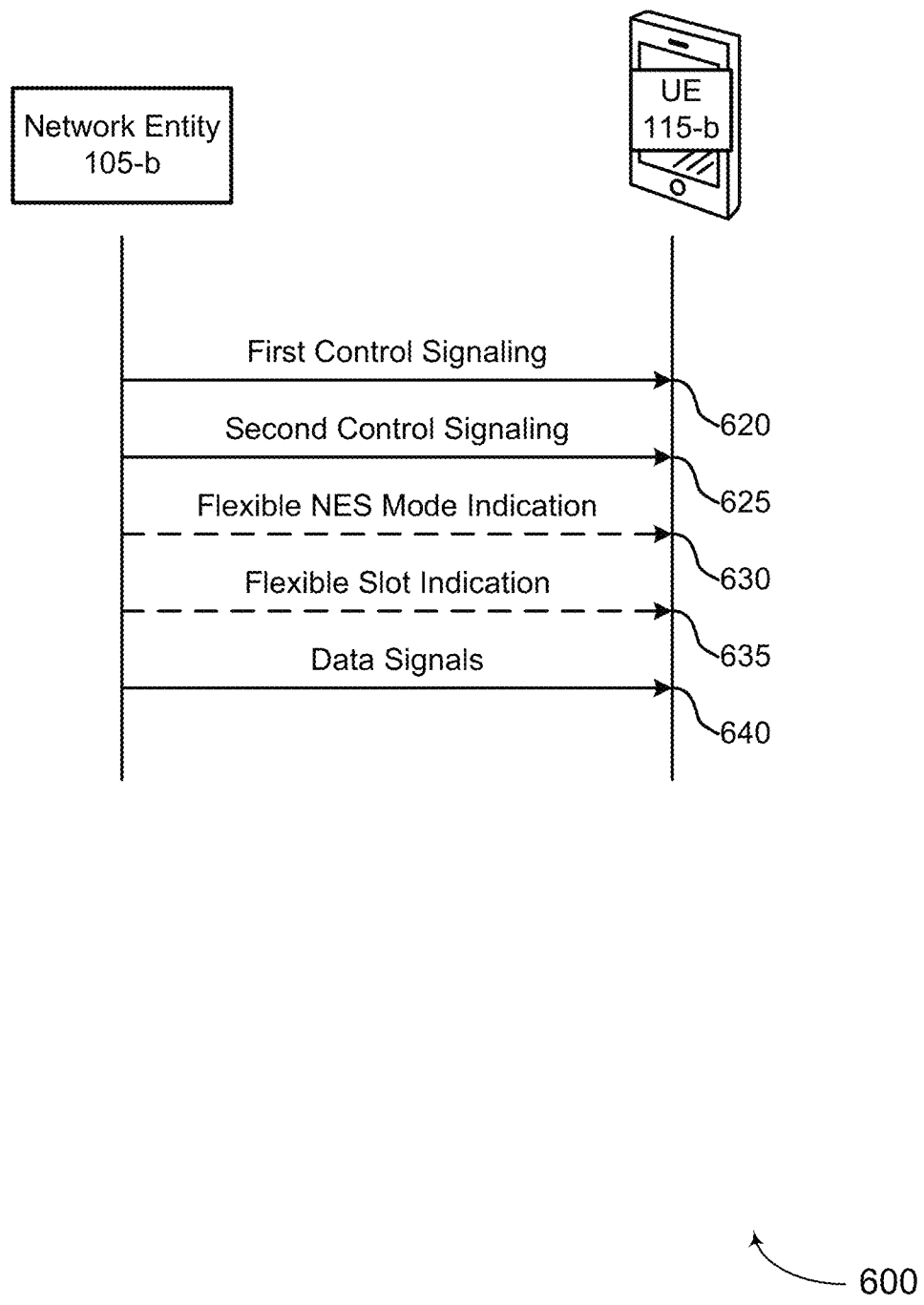
FIG. 6 illustrates an example of a process flow that supports energy saving mode patterns in accordance with one or more aspects of the present disclosure.

FIG. 6 illustrates an example of a process flow 600 that supports energy saving mode patterns in accordance with one or more aspects of the present disclosure. The process flow 600 may implement various aspects of the present disclosure described herein. The elements described in the process flow 600 may be examples of similarly-named elements described herein.

In the following description of the process flow 600, the operations between the various entities or elements (for example, the UE 115-*b* and the network entity 105-*b*) may be performed in different orders or at different times. Some operations may also be left out of the process flow 600, or other operations may be added. Although the various entities or elements may be shown performing the operations of the process flow 600, some aspects of some operations may also be performed by other entities or elements of the process flow 600 or by entities or elements that are not depicted in the process flow, or any combination thereof.

At 620, the UE 115-*b* may receive first control signaling that may indicate an energy saving mode pattern of energy saving mode designations that identify one or more energy saving modes of a network entity and one or more respective durations over which the network entity is to operate in the energy saving modes for transmissions in a plurality of slots, the energy saving mode pattern based at least in part on one or more slot types of the plurality of slots. In some examples, receiving the first control signaling may include receiving a first energy saving mode subpattern of one or more first energy saving modes of the energy saving modes and one or more respective first durations over which the network entity is to operate in the one or more first energy saving modes for both uplink and downlink transmissions.

In some examples, receiving the first control signaling may include receiving a first energy saving mode subpattern of one or more first energy saving modes of the energy saving modes and one or more respective first durations over which the network entity is to operate in the one or more first energy saving modes for downlink transmissions, and receiving a second energy saving mode subpattern of one or more second energy saving modes of the energy saving modes and one or more respective second durations over which the network entity is to operate in the one or more second energy saving modes for uplink transmissions.

In some examples, a beginning of the first energy saving mode subpattern may be aligned in time with a beginning of the second energy saving mode subpattern and with a first division of a time division duplexing format and an end of the first energy saving mode subpattern may be aligned in time with an end of the second energy saving mode subpattern and with a second division of a time division duplexing format. In some examples, the beginning of the first energy saving mode subpattern and the beginning of the second energy saving mode subpattern may be aligned with a first boundary of a time division duplexing format and the end of the first energy saving mode subpattern and the end of the second energy saving mode subpattern may be aligned with a second boundary of a time division duplexing format.

In some examples, the first control signaling may indicate that the one or more respective first durations span each downlink slot of a subframe and the one or more respective second durations span each uplink slot of the subframe.

In some examples, the first energy saving mode subpattern may be associated with a downlink transmission frequency band and the second energy saving mode subpattern may be associated with an uplink transmission frequency band.

In some examples, the energy saving mode pattern may be used at the network entity for one of downlink transmissions or uplink transmissions.

In some examples, each respective duration may be equal to or greater than a minimum energy saving mode duration. In some examples, the minimum energy saving mode duration may be based on a subcarrier spacing.

In some examples, the one or more energy saving modes of a network entity may be associated with one or more sleep modes of the network entity.

At 625, the UE 115-*b* may receive second control signaling scheduling one or more data signals to be communicated between the UE and the network entity during a scheduled duration that at least partially overlaps with at least one of the one or more durations.

At 630, the UE 115-*b* may receive a configuration for a flexible energy saving mode identified in the energy saving mode pattern.

At 635, the UE 115-*b* may receive an indication that one or more flexible slots of a subframe are designated as downlink slots, uplink slots, or any combination thereof.

At 640, the UE 115-*b* may communicate the one or more data signals during the scheduled duration in accordance with the energy saving mode pattern. In some examples, communicating the one or more data signals may include communicating the one or more data signals in accordance with the first energy saving mode subpattern, the second energy saving mode subpattern, or both, based on the one or more data signals being downlink signals, uplink signals, or any combination thereof. In some examples, communicating the one or more data signals may include communicating the one or more data signals in accordance with the first energy saving mode subpattern, the second energy saving mode subpattern, or both, based on the one or more data signals being downlink signals, uplink signals, or any combination thereof.

In some examples, communicating the one or more data signals may include communicating, during the one or more flexible slots, the one or more data signals in accordance with the first energy saving mode subpattern, the second energy saving mode subpattern, or both, based on the indication.

In some examples, communicating the one or more data signals may be in accordance with the flexible energy saving mode.

Figure 7:
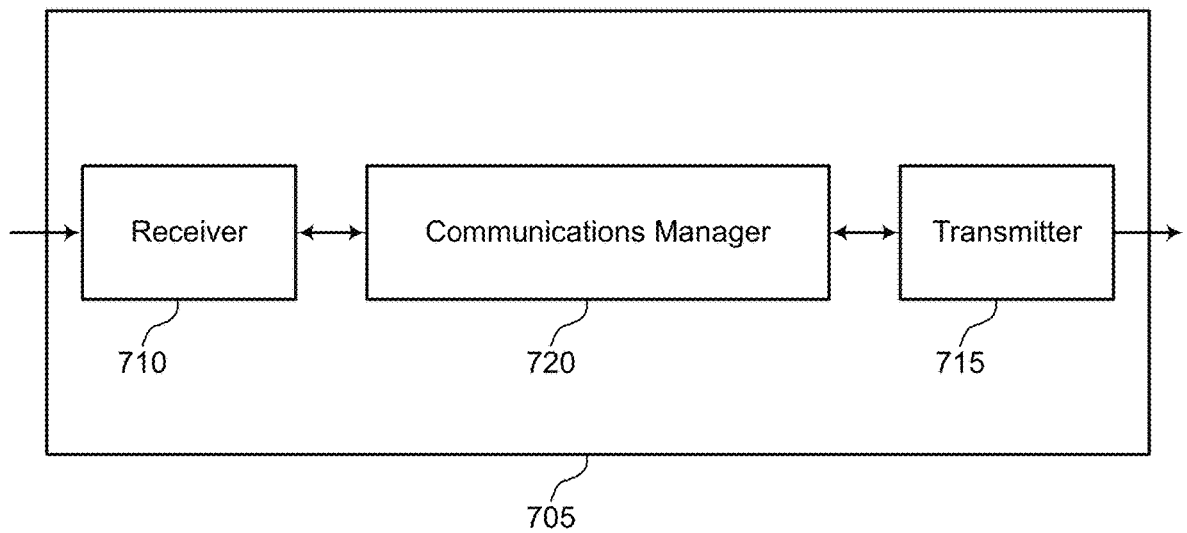
FIGS. 7 and 8 show block diagrams of devices that support energy saving mode patterns in accordance with one or more aspects of the present disclosure.

FIG. 7 shows a block diagram of a device 705 that supports energy saving mode patterns in accordance with one or more aspects of the present disclosure. The device 705 may be an example of aspects of a UE 115 as described herein. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to energy saving mode patterns). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to energy saving mode patterns). In some examples, the transmitter 715 may be co-located with a receiver 710 in a transceiver component. The transmitter 715 may utilize a single antenna or a set of multiple antennas.

The communications manager 720, the receiver 710, the transmitter 715, or various combinations thereof or various components thereof may be examples of means for performing various aspects of energy saving mode patterns as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (for example, in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 720, the receiver 710, the transmitter 715, or various combinations or components thereof may be implemented in code (for example, as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 720 may be configured to perform various operations (for example, receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

Additionally, or alternatively, the communications manager 720 may support wireless communications at a UE in accordance with examples as disclosed herein. For example, the communications manager 720 may be configured as or otherwise support a means for receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The communications manager 720 may be configured as or otherwise support a means for receiving second control signaling scheduling one or more data signals to be communicated between the UE and the network entity during a scheduled duration that at least partially overlaps with at least one of the one or more durations. The communications manager 720 may be configured as or otherwise support a means for communicating the one or more data signals during the scheduled duration in accordance with the energy saving mode pattern.

By including or configuring the communications manager 720 in accordance with examples as described herein, the device 705 (for example, a processor controlling or otherwise coupled with the receiver 710, the transmitter 715, the communications manager 720, or a combination thereof) may support techniques for reduced processing, reduced power consumption, more efficient utilization of communication resources, or any combination thereof.

Figure 8:
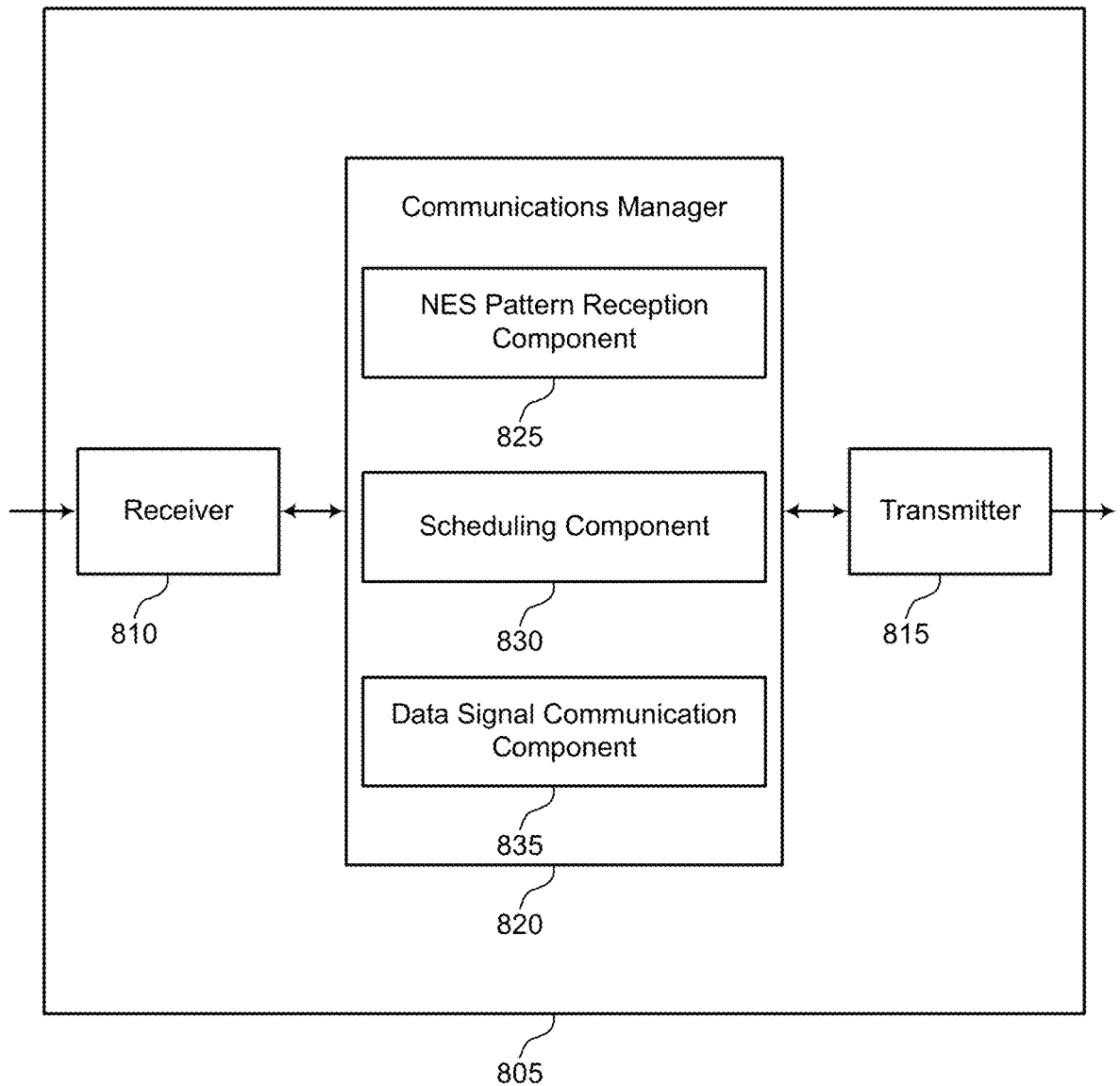

FIG. 8 shows a block diagram of a device 805 that supports energy saving mode patterns in accordance with one or more aspects of the present disclosure. The device 805 may be an example of aspects of a device 705 or a UE 115 as described herein. The device 805 may include a receiver 810, a transmitter 815, and a communications manager 820. The communications manager 820 can be implemented, at least in part, by one or both of a modem and a processor. Each of these components may be in communication with one another (for example, via one or more buses).

The receiver 810 may provide a means for receiving information such as packets, user data, control information, or any combination thereof associated with various information channels (for example, control channels, data channels, information channels related to energy saving mode patterns). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (for example, control channels, data channels, information channels related to energy saving mode patterns). In some examples, the transmitter 815 may be co-located with a receiver 810 in a transceiver component. The transmitter 815 may utilize a single antenna or a set of multiple antennas.

The device 805, or various components thereof, may be an example of means for performing various aspects of energy saving mode patterns as described herein. For example, the communications manager 820 may include a NES pattern reception component 825, a scheduling component 830, a data signal communication component 835, or any combination thereof. In some examples, the communications manager 820, or various components thereof, may be configured to perform various operations (for example, receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a UE in accordance with examples as disclosed herein. The NES pattern reception component 825 may be configured as or otherwise support a means for receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The scheduling component 830 may be configured as or otherwise support a means for receiving second control signaling scheduling one or more data signals to be communicated between the UE and the network entity during a scheduled duration that at least partially overlaps with at least one of the one or more durations. The data signal communication component 835 may be configured as or otherwise support a means for communicating the one or more data signals during the scheduled duration in accordance with the energy saving mode pattern.

Figure 9:
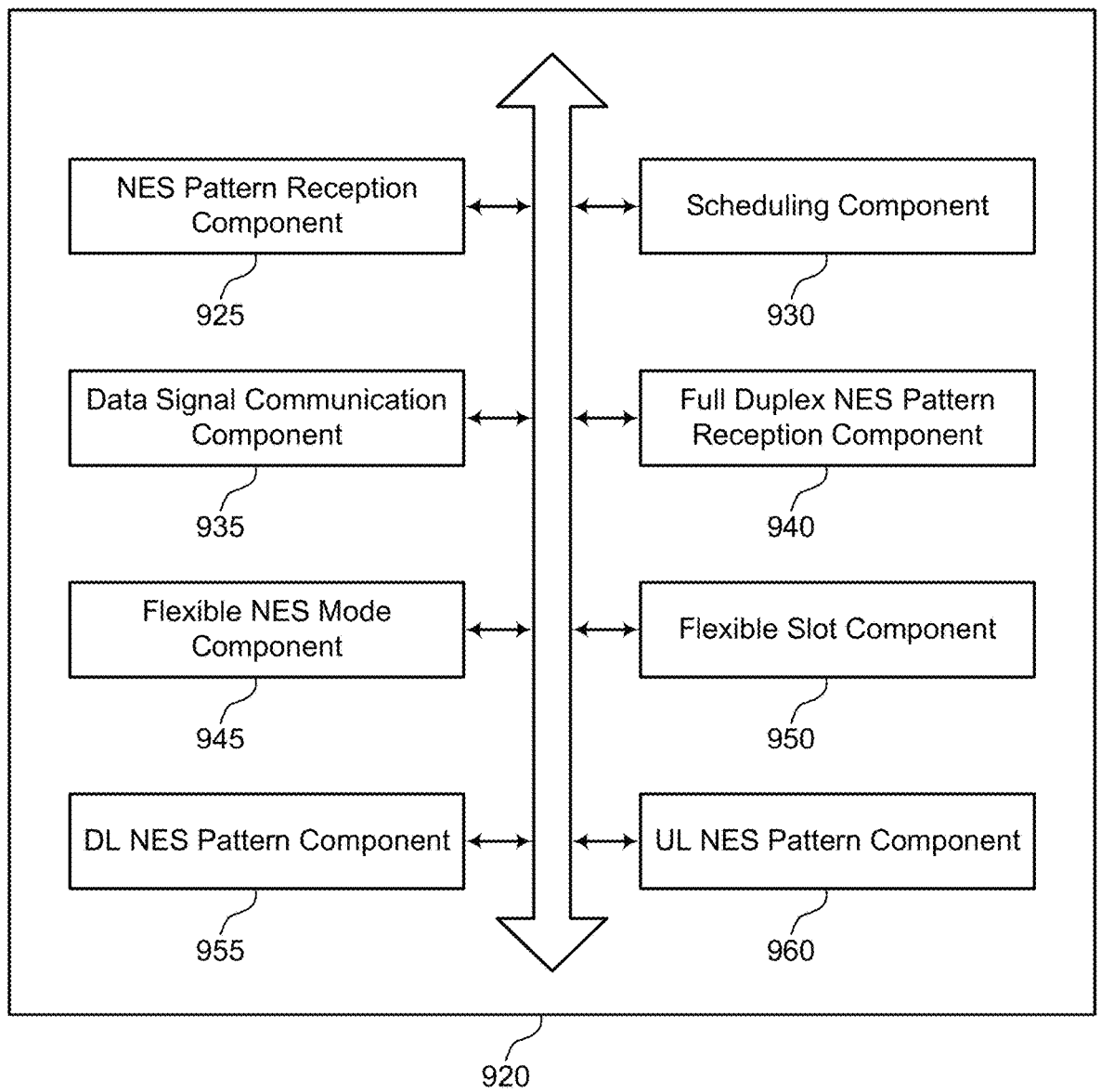
FIG. 9 shows a block diagram of a communications manager that supports energy saving mode patterns in accordance with one or more aspects of the present disclosure.

FIG. 9 shows a block diagram of a communications manager 920 that supports energy saving mode patterns in accordance with one or more aspects of the present disclosure. The communications manager 920, or various components thereof, may be an example of means for performing various aspects of energy saving mode patterns as described herein. For example, the communications manager 920 may include a NES pattern reception component 925, a scheduling component 930, a data signal communication component 935, a full duplex NES pattern reception component 940, a flexible NES mode component 945, a flexible slot component 950, a DL NES pattern component 955, a UL NES pattern component 960, or any combination thereof. Each of these components may communicate, directly or indirectly, with one another (for example, via one or more buses).

Additionally, or alternatively, the communications manager 920 may support wireless communications at a UE in accordance with examples as disclosed herein. The NES pattern reception component 925 may be configured as or otherwise support a means for receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The scheduling component 930 may be configured as or otherwise support a means for receiving second control signaling scheduling one or more data signals to be communicated between the UE and the network entity during a scheduled duration that at least partially overlaps with at least one of the one or more durations. The data signal communication component 935 may be configured as or otherwise support a means for communicating the one or more data signals during the scheduled duration in accordance with the energy saving mode pattern.

In some examples, receiving the first control signaling includes receiving a first energy saving mode subpattern of one or more first energy saving modes of the energy saving modes and one or more respective first durations over which the network entity is to operate in the one or more first energy saving modes for both uplink and downlink transmissions. In some examples, communicating the one or more data signals includes communicating the one or more data signals in accordance with the first energy saving mode subpattern, the second energy saving mode subpattern, or both, based at least in part on the one or more data signals being downlink signals, uplink signals, or any combination thereof.

In some examples the DL NES pattern component 955 may be configured as or otherwise support a means for receiving a first energy saving mode subpattern of one or more first energy saving modes of the energy saving modes and one or more respective first durations over which the network entity is to operate in the one or more first energy saving modes for downlink transmissions and the UL NES pattern component 960 may be configured as or otherwise support a means for receiving a second energy saving mode subpattern of one or more second energy saving modes designations of the energy saving mode designationsenergy saving modes and one or more respective second durations over which the network entity is to operate in the one or more second energy saving mode designationsenergy saving modes are to be used at the network entity for uplink transmissions. In some examples, communicating the one or more data signals includes communicating the one or more data signals in accordance with the first energy saving mode subpattern, the second energy saving mode subpattern, or both, based on the one or more data signals being downlink signals, uplink signals, or any combination thereof.

In some examples, a beginning of the first energy saving mode subpattern is aligned in time with a beginning of the second energy saving mode subpattern and with a first division of a time division duplexing format. In some examples, an end of the first energy saving mode subpattern is aligned in time with an end of the second energy saving mode subpattern and with a second division of a time division duplexing format.

In some examples, the beginning of the first energy saving mode subpattern and the beginning of the second energy saving mode subpattern are aligned with a first boundary of a time division duplexing format. In some examples, the end of the first energy saving mode subpattern and the end of the second energy saving mode subpattern are aligned with a second boundary of a time division duplexing format.

In some examples, the first control signaling indicates that the one or more respective first durations span each downlink slot of a subframe and the one or more respective second durations span each uplink slot of the subframe.

In some examples, the flexible slot component 950 may be configured as or otherwise support a means for receiving an indication that one or more flexible slots of a subframe are designated as downlink slots, uplink slots, or any combination thereof. In some examples, the data signal communication component 935 may be configured as or otherwise support a means for where communicating the one or more data signals includes communicating, during the one or more flexible slots, the one or more data signals in accordance with the first energy saving mode subpattern, the second energy saving mode subpattern, or both, based on the indication.

In some examples, the first energy saving mode subpattern is associated with a downlink transmission frequency band. In some examples, the second energy saving mode subpattern is associated with an uplink transmission frequency band.

In some examples, the energy saving mode pattern is to be used at the network entity for one of downlink transmissions or uplink transmissions.

In some examples, the flexible NES mode component 945 may be configured as or otherwise support a means for receiving a configuration for a flexible energy saving mode identified in the energy saving mode pattern, where communicating the one or more data signals is in accordance with the flexible energy saving mode.

In some examples, each respective duration is equal to or greater than a minimum energy saving mode duration.

In some examples, the minimum energy saving mode duration is based on a subcarrier spacing.

In some examples, the one or more energy saving modes of a network entity are associated with one or more sleep modes of the network entity.

Figure 10:
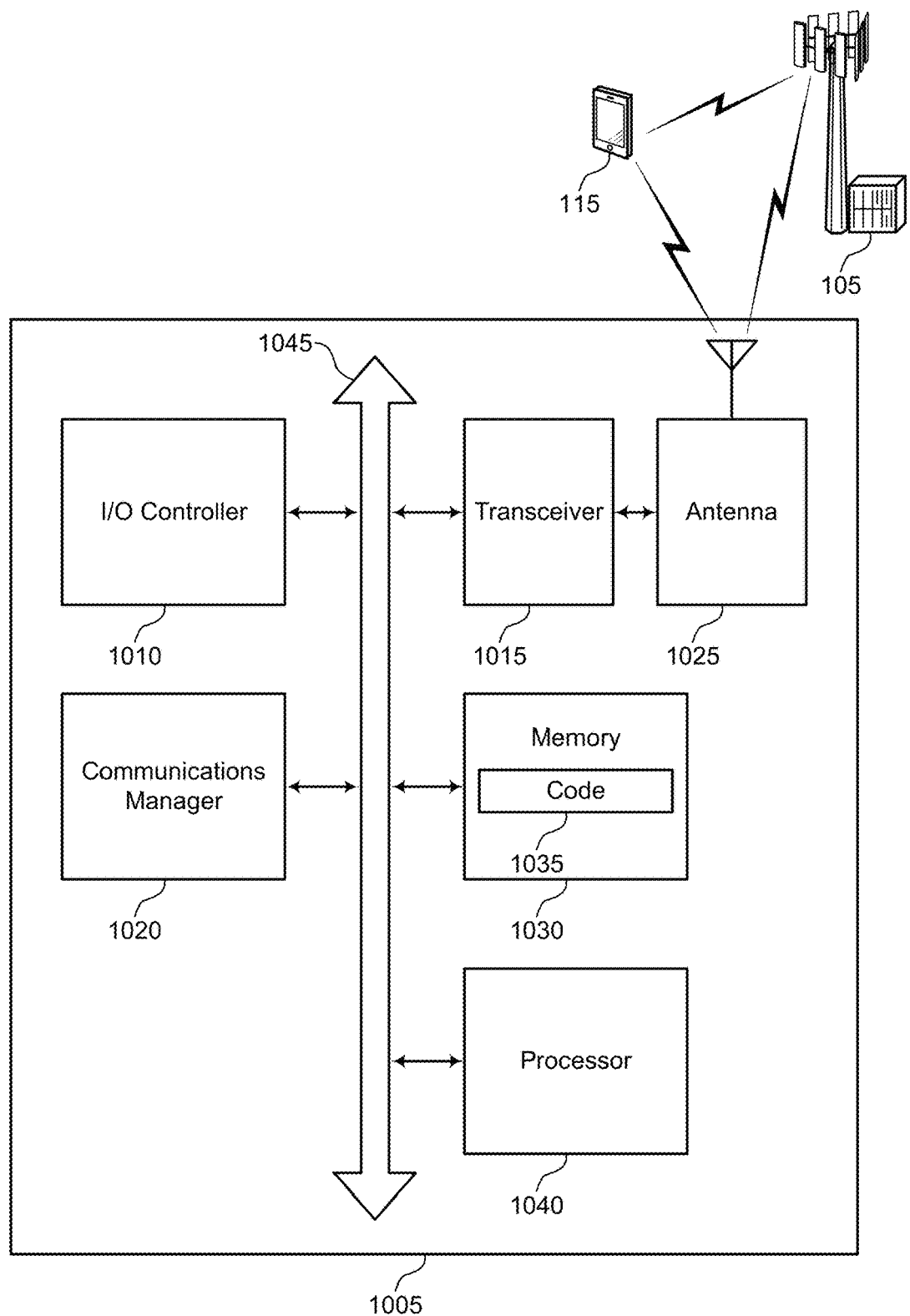
FIG. 10 shows a diagram of a system including a device that supports energy saving mode patterns in accordance with one or more aspects of the present disclosure.

FIG. 10 shows a diagram of a system including a device 1005 that supports energy saving mode patterns in accordance with one or more aspects of the present disclosure. The device 1005 may be an example of or include the components of a device 705, a device 805, or a UE 115 as described herein. The device 1005 may communicate (for example, wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (for example, operatively, communicatively, functionally, electronically, electrically) via one or more buses (for example, a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (for example, when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (for example, the memory 1030) to cause the device 1005 to perform various functions (for example, functions or tasks supporting energy saving mode patterns). For example, the device 1005 or a component of the device 1005 may include a processor 1040 and memory 1030 coupled with or to the processor 1040, the processor 1040 and memory 1030 configured to perform various functions described herein.

Additionally, or alternatively, the communications manager 1020 may support wireless communications at a UE in accordance with examples as disclosed herein. For example, the communications manager 1020 may be configured as or otherwise support a means for receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The communications manager 1020 may be configured as or otherwise support a means for receiving second control signaling scheduling one or more data signals to be communicated between the UE and the network entity during a scheduled duration that at least partially overlaps with at least one of the one or more durations. The communications manager 1020 may be configured as or otherwise support a means for communicating the one or more data signals during the scheduled duration in accordance with the energy saving mode pattern.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1020 may be configured to perform various operations (for example, receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of energy saving mode patterns as described herein, or the processor 1040 and the memory 1030 may be otherwise configured to perform or support such operations.

Figure 11:
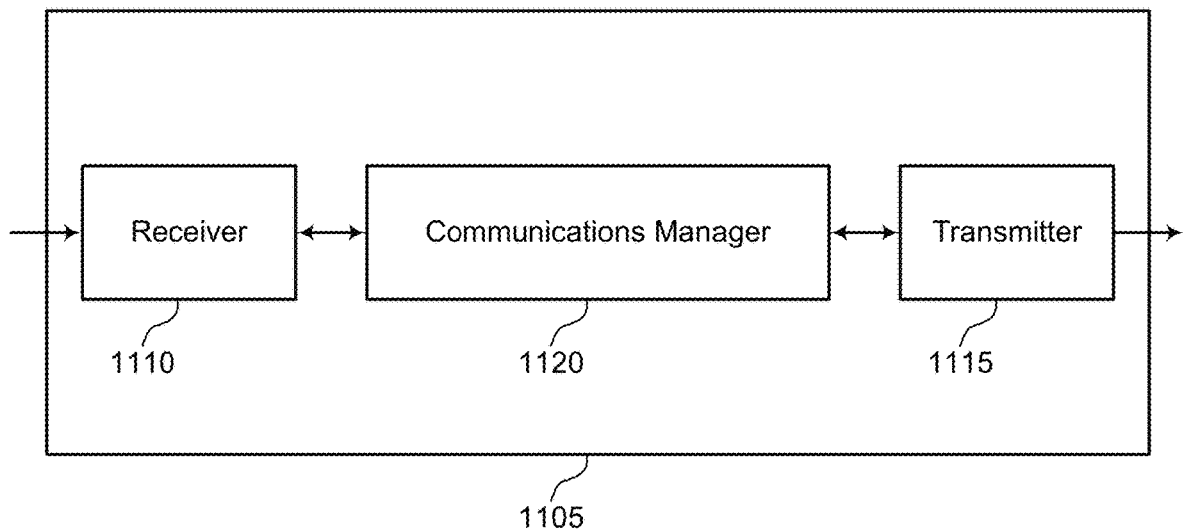
FIGS. 11 and 12 show block diagrams of devices that support energy saving mode patterns in accordance with one or more aspects of the present disclosure.

FIG. 11 shows a block diagram of a device 1105 that supports energy saving mode patterns in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (for example, via one or more buses).

The receiver 1110 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (for example, electrical, fiber optic) interfaces, wireless interfaces, or any combination thereof.

The transmitter 1115 may provide a means for outputting (for example, transmitting, providing, conveying, sending) information generated by other components of the device 1105. For example, the transmitter 1115 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (for example, electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of energy saving mode patterns as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (for example, in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally, or alternatively, in some examples, the communications manager 1120, the receiver 1110, the transmitter 1115, or various combinations or components thereof may be implemented in code (for example, as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (for example, configured as or otherwise supporting a means for performing the functions described in the present disclosure).

In some examples, the communications manager 1120 may be configured to perform various operations (for example, receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

Additionally, or alternatively, the communications manager 1120 may support wireless communications at a network entity in accordance with examples as disclosed herein. For example, the communications manager 1120 may be configured as or otherwise support a means for transmitting first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The communications manager 1120 may be configured as or otherwise support a means for transmitting second control signaling scheduling one or more data signals to be communicated between the UE and the network entity during a scheduled duration that at least partially overlaps with at least one of the one or more durations. The communications manager 1120 may be configured as or otherwise support a means for communicating the one or more data signals during the scheduled duration in accordance with the energy saving mode pattern.

By including or configuring the communications manager 1120 in accordance with examples as described herein, the device 1105 (for example, a processor controlling or otherwise coupled with the receiver 1110, the transmitter 1115, the communications manager 1120, or a combination thereof) may support techniques for reduced processing, reduced power consumption, more efficient utilization of communication resources, or any combination thereof.

Figure 12:
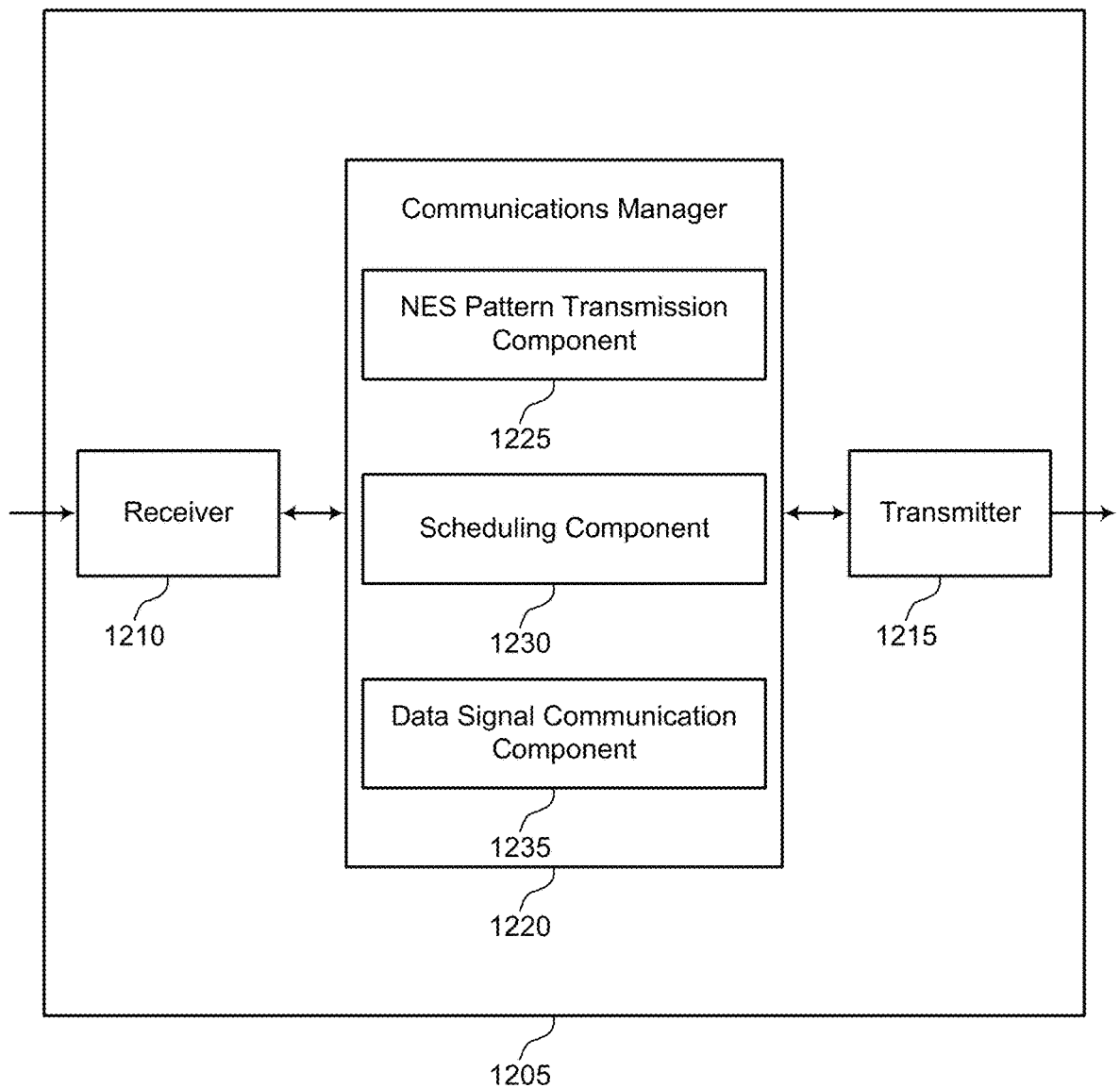

FIG. 12 shows a block diagram of a device 1205 that supports energy saving mode patterns in accordance with one or more aspects of the present disclosure. The device 1205 may be an example of aspects of a device 1105 or a network entity 105 as described herein. The device 1205 may include a receiver 1210, a transmitter 1215, and a communications manager 1220. The communications manager 1220 can be implemented, at least in part, by one or both of a modem and a processor. Each of these components may be in communication with one another (for example, via one or more buses).

The receiver 1210 may provide a means for obtaining (for example, receiving, determining, identifying) information such as user data, control information, or any combination thereof (for example, I/Q samples, symbols, packets, protocol data units, service data units) associated with various channels (for example, control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (for example, electrical, fiber optic) interfaces, wireless interfaces, or any combination thereof.

The transmitter 1215 may provide a means for outputting (for example, transmitting, providing, conveying, sending) information generated by other components of the device 1205. For example, the transmitter 1215 may output information such as user data, control information, or any combination thereof (for example, I/Q samples, symbols, packets, protocol data units, service data units) associated with various channels (for example, control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (for example, electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of energy saving mode patterns as described herein. For example, the communications manager 1220 may include a NES pattern transmission component 1225, a scheduling component 1230, a data signal communication component 1235, or any combination thereof. In some examples, the communications manager 1220, or various components thereof, may be configured to perform various operations (for example, receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communications at a network entity in accordance with examples as disclosed herein. The NES pattern transmission component 1225 may be configured as or otherwise support a means for transmitting first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The scheduling component 1230 may be configured as or otherwise support a means for transmitting second control signaling scheduling one or more data signals to be communicated between the UE and the network entity during a scheduled duration that at least partially overlaps with at least one of the one or more durations. The data signal communication component 1235 may be configured as or otherwise support a means for communicating the one or more data signals during the scheduled duration in accordance with the energy saving mode pattern.

Figure 13:
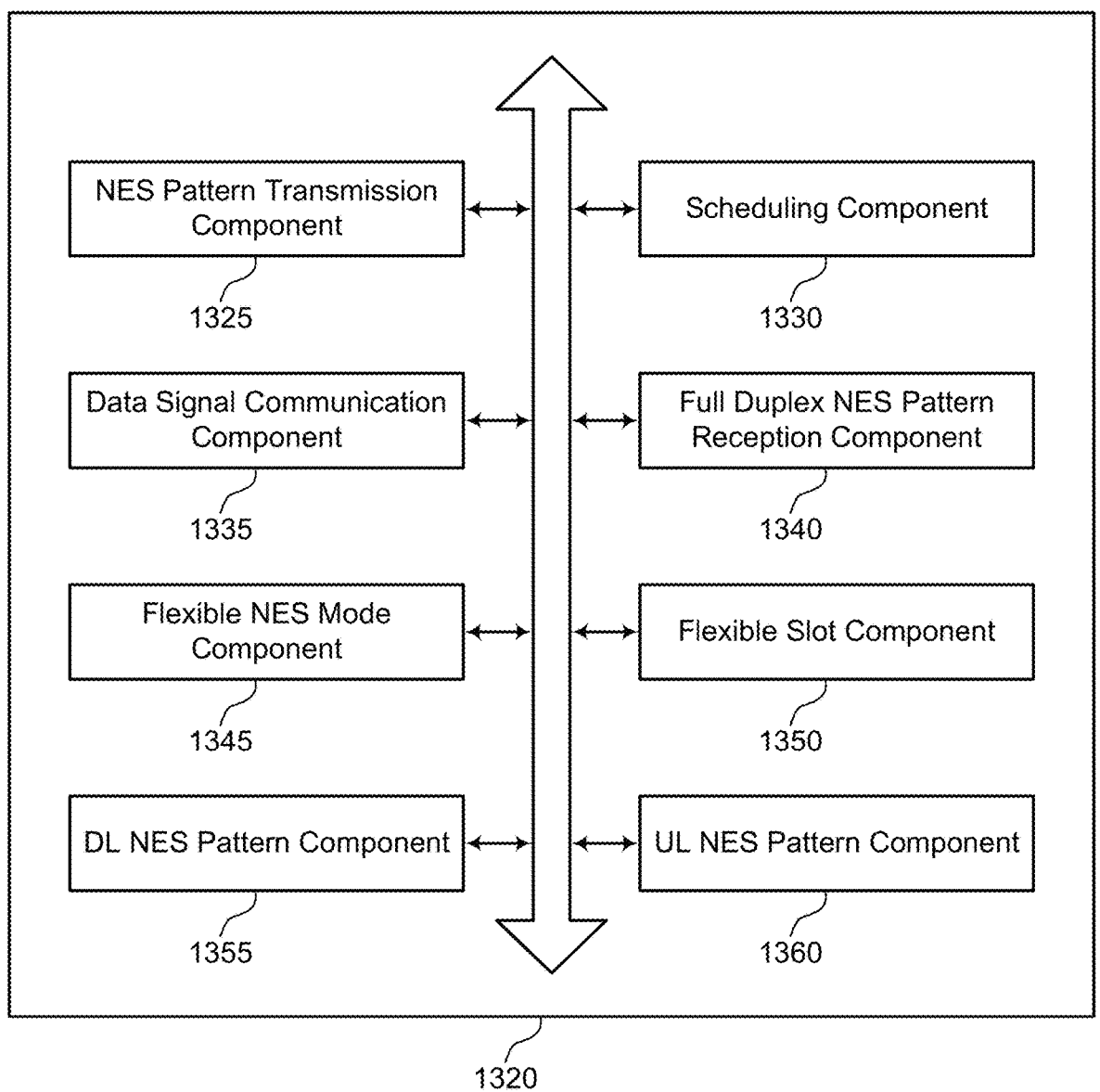
FIG. 13 shows a block diagram of a communications manager that supports energy saving mode patterns in accordance with one or more aspects of the present disclosure.

FIG. 13 shows a block diagram of a communications manager 1320 that supports energy saving mode patterns in accordance with one or more aspects of the present disclosure. The communications manager 1320, or various components thereof, may be an example of means for performing various aspects of energy saving mode patterns as described herein. For example, the communications manager 1320 may include a NES pattern transmission component 1325, a scheduling component 1330, a data signal communication component 1335, a full duplex NES pattern reception component 1340, a flexible NES mode component 1345, a flexible slot component 1350, a DL NES pattern component 1355, a UL NES pattern component 1360, or any combination thereof. Each of these components may communicate, directly or indirectly, with one another (for example, via one or more buses) which may include communications within a protocol layer of a protocol stack, communications associated with a logical channel of a protocol stack (for example, between protocol layers of a protocol stack, within a device, component, or virtualized component associated with a network entity 105, between devices, components, or virtualized components associated with a network entity 105), or any combination thereof.

Additionally, or alternatively, the communications manager 1320 may support wireless communications at a network entity in accordance with examples as disclosed herein. The NES pattern transmission component 1325 may be configured as or otherwise support a means for transmitting first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The scheduling component 1330 may be configured as or otherwise support a means for transmitting second control signaling scheduling one or more data signals to be communicated between the UE and the network entity during a scheduled duration that at least partially overlaps with at least one of the one or more durations. The data signal communication component 1335 may be configured as or otherwise support a means for communicating the one or more data signals during the scheduled duration in accordance with the energy saving mode pattern.

In some examples, the full duplex NES pattern reception component 1340 may be configured as or otherwise support a means for transmitting the first control signaling including receiving a first energy saving mode subpattern of one or more first energy saving modes of the energy saving modes and one or more respective first durations over which the network entity is to operate in the one or more first energy saving modes for both uplink and downlink transmissions. In some examples, the data signal communication component 1335 may be configured as or otherwise support a means for communicating the one or more data signals includes communicating the one or more data signals in accordance with the first energy saving mode subpattern, the second energy saving mode subpattern, or both, based at least in part on the one or more data signals being downlink signals, uplink signals, or any combination thereof.

In some examples the DL NES pattern component 1355 may be configured as or otherwise support a means for transmitting a first energy saving mode subpattern of one or more first energy saving modes of the energy saving modes and one or more respective first durations over which the network entity is to operate in the one or more first energy saving modes for downlink transmissions and the UL NES pattern component 1360 may be configured as or otherwise support a means for transmitting a second energy saving mode subpattern of one or more second energy saving modes designations of the energy saving mode designationsenergy saving modes and one or more respective second durations over which the network entity is to operate in the one or more second energy saving mode designationsenergy saving modes are to be used at the network entity for uplink transmissions. In some examples, communicating the one or more data signals includes communicating the one or more data signals in accordance with the first energy saving mode subpattern, the second energy saving mode subpattern, or both, based on the one or more data signals being downlink signals, uplink signals, or any combination thereof.

In some examples, a beginning of the first energy saving mode subpattern is aligned in time with a beginning of the second energy saving mode subpattern and with a first division of a time division duplexing format. In some examples, an end of the first energy saving mode subpattern is aligned in time with an end of the second energy saving mode subpattern and with a second division of a time division duplexing format.

In some examples, the beginning of the first energy saving mode subpattern and the beginning of the second energy saving mode subpattern are aligned with a first boundary of a time division duplexing format. In some examples, the end of the first energy saving mode subpattern and the end of the second energy saving mode subpattern are aligned with a second boundary of a time division duplexing format.

In some examples, the first control signaling indicates that the one or more respective first durations span each downlink slot of a subframe and the one or more respective second durations span each uplink slot of the subframe.

In some examples, the flexible slot component 1350 may be configured as or otherwise support a means for transmitting an indication that one or more flexible slots of a subframe are designated as downlink slots, uplink slots, or any combination thereof. In some examples, the data signal communication component 1335 may be configured as or otherwise support a means for where communicating the one or more data signals includes communicating, during the one or more flexible slots, the one or more data signals in accordance with the first energy saving mode subpattern, the second energy saving mode subpattern, or both, based on the indication.

In some examples, the first energy saving mode subpattern is associated with a downlink transmission frequency band. In some examples, the second energy saving mode subpattern is associated with an uplink transmission frequency band.

In some examples, the energy saving mode pattern is to be used at the network entity for one of downlink transmissions or uplink transmissions.

In some examples, the flexible NES mode component 1345 may be configured as or otherwise support a means for transmitting a configuration for a flexible energy saving mode identified in the energy saving mode pattern, where communicating the one or more data signals is in accordance with the flexible energy saving mode.

In some examples, each respective duration is equal to or greater than a minimum energy saving mode duration.

In some examples, the minimum energy saving mode duration is based on a subcarrier spacing.

In some examples, the one or more energy saving modes of a network entity are associated with one or more sleep modes of the network entity.

Figure 14:
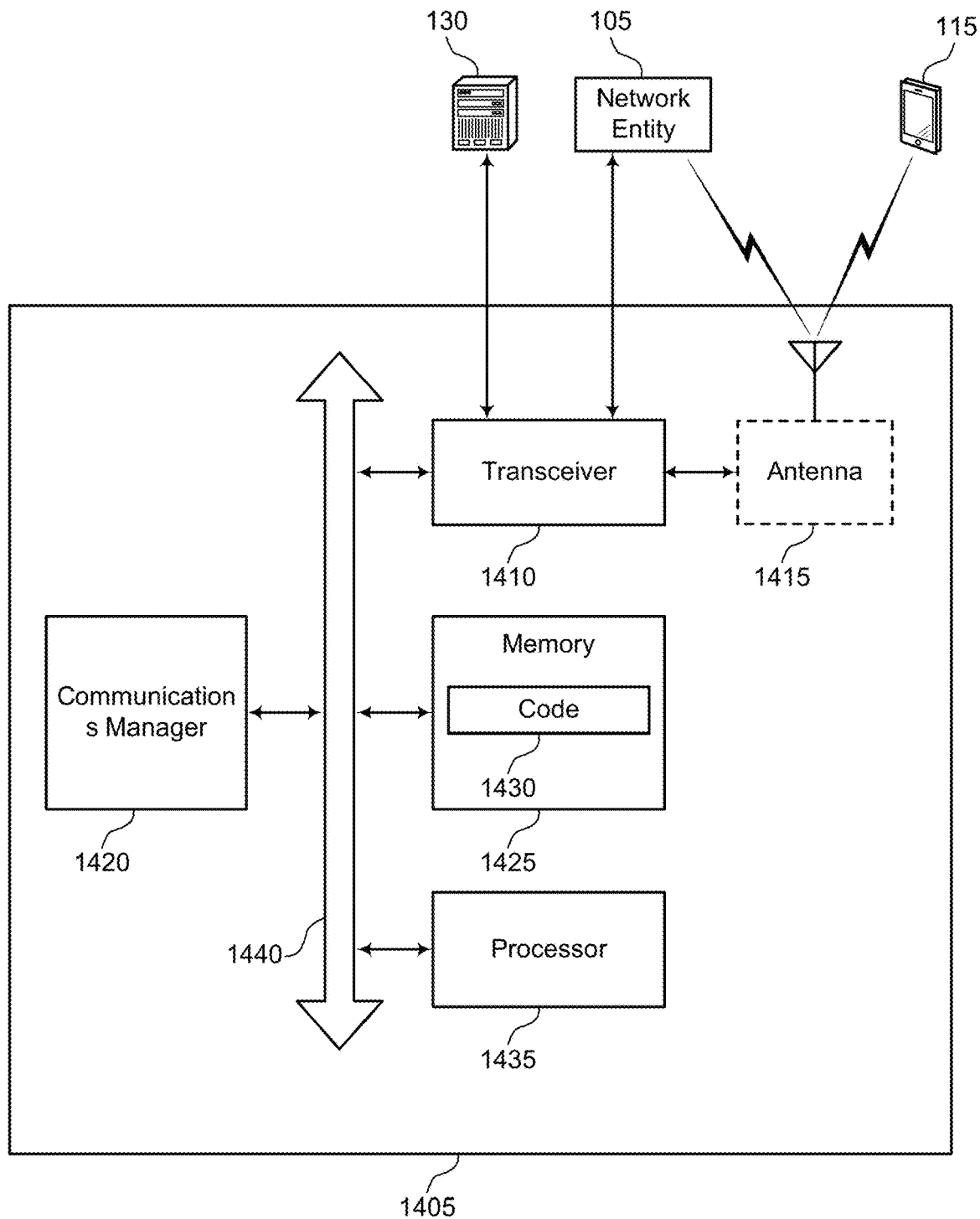
FIG. 14 shows a diagram of a system including a device that supports energy saving mode patterns in accordance with one or more aspects of the present disclosure.

FIG. 14 shows a diagram of a system including a device 1405 that supports energy saving mode patterns in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (for example, operatively, communicatively, functionally, electronically, electrically) via one or more buses (for example, a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (for example, concurrently). The transceiver 1410 may also include a modem to modulate signals, to provide the modulated signals for transmission (for example, by one or more antennas 1415, by a wired transmitter), to receive modulated signals (for example, from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. The transceiver 1410, or the transceiver 1410 and one or more antennas 1415 or wired interfaces, where applicable, may be an example of a transmitter 1115, a transmitter 1215, a receiver 1110, a receiver 1210, or any combination thereof or component thereof, as described herein. In some examples, the transceiver may be operable to support communications via one or more communications links (for example, a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (for example, when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (for example, a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (for example, the memory 1425) to cause the device 1405 to perform various functions (for example, functions or tasks supporting energy saving mode patterns). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (for example, one or more physical nodes and supporting software such as operating systems, virtual machines, or container instances) that may host the functions (for example, by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and an interface to output information, or to obtain information, or both. The interface may be implemented as or otherwise include a first interface configured to output information and a second interface configured to obtain information. In some implementations, the first interface may refer to an interface between the processing system of the chip or modem and a transmitter, such that the device 1405 may transmit information output from the chip or modem. In some implementations, the second interface may refer to an interface between the processing system of the chip or modem and a receiver, such that the device 1405 may obtain information or signal inputs, and the information may be passed to the processing system. A person having ordinary skill in the art will readily recognize that the first interface also may obtain information or signal inputs, and the second interface also may output information or signal outputs.

In some examples, a bus 1440 may support communications of (for example, within) a protocol layer of a protocol stack. In some examples, a bus 1440 may support communications associated with a logical channel of a protocol stack (for example, between protocol layers of a protocol stack), which may include communications performed within a component of the device 1405, or between different components of the device 1405 that may be co-located or located in different locations (for example, where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (for example, via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

Additionally, or alternatively, the communications manager 1420 may support wireless communications at a network entity in accordance with examples as disclosed herein. For example, the communications manager 1420 may be configured as or otherwise support a means for transmitting first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The communications manager 1420 may be configured as or otherwise support a means for transmitting second control signaling scheduling one or more data signals to be communicated between the UE and the network entity during a scheduled duration that at least partially overlaps with at least one of the one or more durations. The communications manager 1420 may be configured as or otherwise support a means for communicating the one or more data signals during the scheduled duration in accordance with the energy saving mode pattern.

By including or configuring the communications manager 1420 in accordance with examples as described herein, the device 1405 may support techniques for improved communication reliability, reduced latency, improved user experience related to reduced processing, reduced power consumption, more efficient utilization of communication resources, improved coordination between devices, longer battery life, improved utilization of processing capability, or any combination thereof.

In some examples, the communications manager 1420 may be configured to perform various operations (for example, receiving, obtaining, monitoring, outputting, transmitting) using or otherwise in cooperation with the transceiver 1410, the one or more antennas 1415 (for example, where applicable), or any combination thereof. Although the communications manager 1420 is illustrated as a separate component, in some examples, one or more functions described with reference to the communications manager 1420 may be supported by or performed by the processor 1435, the memory 1425, the code 1430, the transceiver 1410, or any combination thereof. For example, the code 1430 may include instructions executable by the processor 1435 to cause the device 1405 to perform various aspects of energy saving mode patterns as described herein, or the processor 1435 and the memory 1425 may be otherwise configured to perform or support such operations.

Figure 15:
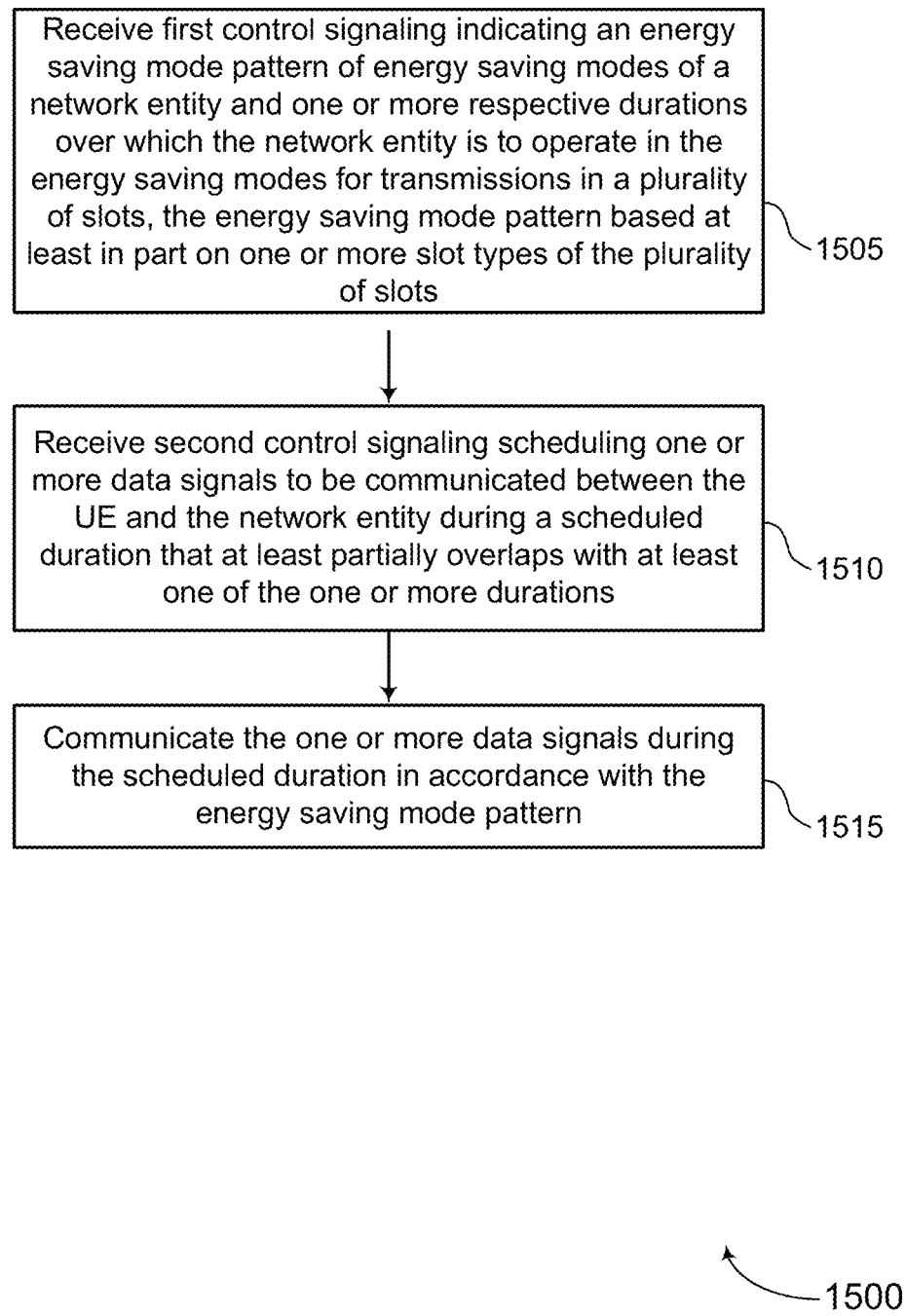
FIGS. 15 and 16 show flowcharts illustrating methods that support energy saving mode patterns in accordance with one or more aspects of the present disclosure.

FIG. 15 shows a flowchart illustrating a method 1500 that supports energy saving mode patterns in accordance with one or more aspects of the present disclosure. The operations of the method 1500 may be implemented by a UE or its components as described herein. For example, the operations of the method 1500 may be performed by a UE 115 as described with reference to FIGS. 1-10. In some examples, a UE may execute a set of instructions to control the functional elements of the UE to perform the described functions. Additionally, or alternatively, the UE may perform aspects of the described functions using special-purpose hardware.

At 1505, the method may include receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The operations of 1505 may be performed in accordance with examples as disclosed herein. In some examples, aspects of the operations of 1505 may be performed by a NES pattern reception component 925 as described with reference to FIG. 9.

At 1510, the method may include receiving second control signaling scheduling one or more data signals to be communicated between the UE and the network entity during a scheduled duration that at least partially overlaps with at least one of the one or more durations. The operations of 1510 may be performed in accordance with examples as disclosed herein. In some examples, aspects of the operations of 1510 may be performed by a scheduling component 930 as described with reference to FIG. 9.

At 1515, the method may include communicating the one or more data signals during the scheduled duration in accordance with the energy saving mode pattern. The operations of 1515 may be performed in accordance with examples as disclosed herein. In some examples, aspects of the operations of 1515 may be performed by a data signal communication component 935 as described with reference to FIG. 9.

Figure 16:
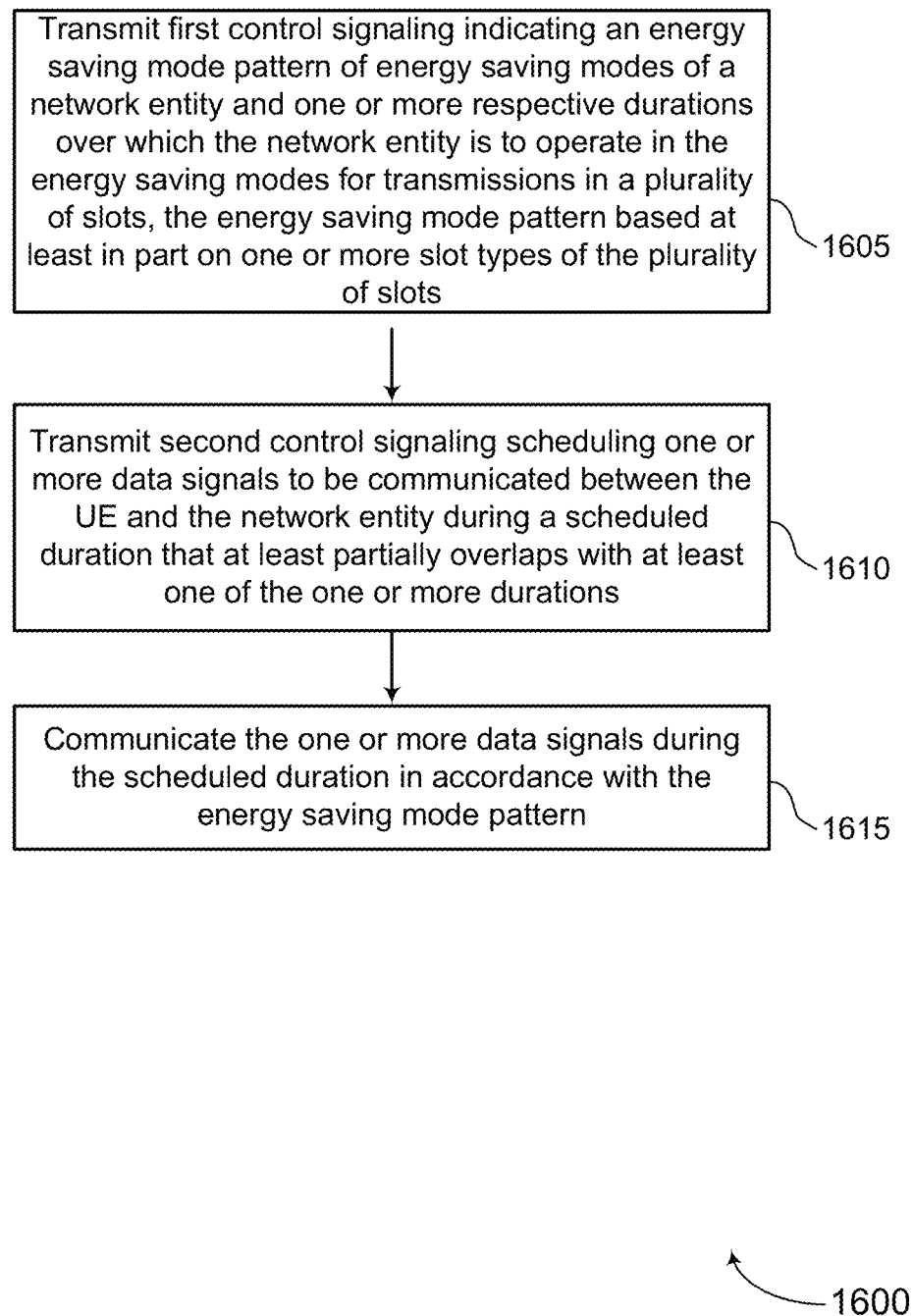

FIG. 16 shows a flowchart illustrating a method 1600 that supports energy saving mode patterns in accordance with one or more aspects of the present disclosure. The operations of the method 1600 may be implemented by a network entity or its components as described herein. For example, the operations of the method 1600 may be performed by a network entity as described with reference to FIGS. 1-6 and 11-14. In some examples, a network entity may execute a set of instructions to control the functional elements of the network entity to perform the described functions. Additionally, or alternatively, the network entity may perform aspects of the described functions using special-purpose hardware.

At 1605, the method may include transmitting first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots. The operations of 1605 may be performed in accordance with examples as disclosed herein. In some examples, aspects of the operations of 1605 may be performed by a NES pattern transmission component 1325 as described with reference to FIG. 13.

At 1610, the method may include transmitting second control signaling scheduling one or more data signals to be communicated between the UE and the network entity during a scheduled duration that at least partially overlaps with at least one of the one or more durations. The operations of 1610 may be performed in accordance with examples as disclosed herein. In some examples, aspects of the operations of 1610 may be performed by a scheduling component 1330 as described with reference to FIG. 13.

At 1615, the method may include communicating the one or more data signals during the scheduled duration in accordance with the energy saving mode pattern. The operations of 1615 may be performed in accordance with examples as disclosed herein. In some examples, aspects of the operations of 1615 may be performed by a data signal communication component 1335 as described with reference to FIG. 13.

The following provides an overview of aspects of the present disclosure:

Aspect 1: A method for wireless communications at a UE, comprising: receiving first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots; receiving second control signaling scheduling one or more data signals to be communicated between the UE and the network entity during a scheduled duration that at least partially overlaps with at least one of the one or more durations; and communicating the one or more data signals during the scheduled duration in accordance with the energy saving mode pattern.

Aspect 2: The method of aspect 1, further comprising: receiving the first control signaling comprises receiving a first energy saving mode subpattern of one or more first energy saving modes of the energy saving modes and one or more respective first durations over which the network entity is to operate in the one or more first energy saving modes for both uplink and downlink transmissions; and communicating the one or more data signals comprises communicating the one or more data signals in accordance with the first energy saving mode subpattern, the second energy saving mode subpattern, or both, based at least in part on the one or more data signals being downlink signals, uplink signals, or any combination thereof.

Aspect 3: The method of any of aspects 1 through 2, wherein receiving the first control signaling comprises: receiving a first energy saving mode subpattern of one or more first energy saving modes of the energy saving modes and one or more respective first durations over which the network entity is to operate in the one or more first energy saving modes for downlink transmissions; and receiving a second energy saving mode subpattern of one or more second energy saving modes of the energy saving modes and one or more respective second durations over which the network entity is to operate in the one or more second energy saving modes for uplink transmissions; and communicating the one or more data signals comprises communicating the one or more data signals in accordance with the first energy saving mode subpattern, the second energy saving mode subpattern, or both, based at least in part on the one or more data signals being downlink signals, uplink signals, or any combination thereof.

Aspect 4: The method of aspect 3, wherein a beginning of the first energy saving mode subpattern is aligned in time with a beginning of the second energy saving mode subpattern and with a first division of a time division duplexing format; and an end of the first energy saving mode subpattern is aligned in time with an end of the second energy saving mode subpattern and with a second division of a time division duplexing format.

Aspect 5: The method of aspect 4, wherein the beginning of the first energy saving mode subpattern and the beginning of the second energy saving mode subpattern are aligned with a first boundary of a time division duplexing format; and the end of the first energy saving mode subpattern and the end of the second energy saving mode subpattern are aligned with a second boundary of a time division duplexing format.

Aspect 6: The method of any of aspects 3 through 5, wherein the first control signaling indicates that the one or more respective first durations span each downlink slot of a subframe and the one or more respective second durations span each uplink slot of the subframe.

Aspect 7: The method of any of aspects 3 through 6, further comprising: receiving an indication that one or more flexible slots of a subframe are designated as downlink slots, uplink slots, or any combination thereof; and wherein communicating the one or more data signals comprises communicating, during the one or more flexible slots, the one or more data signals in accordance with the first energy saving mode subpattern, the second energy saving mode subpattern, or both, based at least in part on the indication.

Aspect 8: The method of any of aspects 3 through 7, wherein the first energy saving mode subpattern is associated with a downlink transmission frequency band; and the second energy saving mode subpattern is associated with an uplink transmission frequency band.

Aspect 9: The method of any of aspects 1 through 8, wherein the energy saving mode pattern is to be used at the network entity for one of downlink transmissions or uplink transmissions.

Aspect 10: The method of any of aspects 1 through 9, further comprising: receiving a configuration for a flexible energy saving mode identified in the energy saving mode pattern, wherein communicating the one or more data signals is in accordance with the flexible energy saving mode.

Aspect 11: The method of any of aspects 1 through 10, wherein each respective duration is equal to or greater than a minimum energy saving mode duration.

Aspect 12: The method of aspect 11, wherein the minimum energy saving mode duration is based at least in part on a subcarrier spacing.

Aspect 13: The method of any of aspects 1 through 12, wherein the one or more energy saving modes of a network entity are associated with one or more sleep modes of the network entity.

Aspect 14: A method for wireless communications at a network entity, comprising: transmitting first control signaling indicating an energy saving mode pattern of energy saving modes of a network entity and one or more respective durations over which the network entity is to operate in the energy saving modes for transmissions in a plurality of slots, the energy saving mode pattern based at least in part on one or more slot types of the plurality of slots; transmitting second control signaling scheduling one or more data signals to be communicated between a UE and the network entity during a scheduled duration that at least partially overlaps with at least one of the one or more durations; and communicating the one or more data signals during the scheduled duration in accordance with the energy saving mode pattern.

Aspect 15: The method of aspect 14, further comprising: transmitting the first control signaling comprises receiving a first energy saving mode subpattern of one or more first energy saving modes of the energy saving modes and one or more respective first durations over which the network entity is to operate in the one or more first energy saving modes for both uplink and downlink transmissions; and communicating the one or more data signals comprises communicating the one or more data signals in accordance with the first energy saving mode subpattern, the second energy saving mode subpattern, or both, based at least in part on the one or more data signals being downlink signals, uplink signals, or any combination thereof.

Aspect 16: The method of any of aspects 14 through 15, wherein transmitting the first control signaling comprises: transmitting a first energy saving mode subpattern of one or more first energy saving modes of the energy saving modes and one or more respective first durations over which the network entity is to operate in the one or more first energy saving modes for downlink transmissions; and transmitting a second energy saving mode subpattern of one or more second energy saving modes of the energy saving modes and one or more respective second durations over which the network entity is to operate in the one or more second energy saving modes for uplink transmissions; and communicating the one or more data signals comprises communicating the one or more data signals in accordance with the first energy saving mode subpattern, the second energy saving mode subpattern, or both, based at least in part on the one or more data signals being downlink signals, uplink signals, or any combination thereof.

Aspect 17: The method of aspect 16, wherein a beginning of the first energy saving mode subpattern is aligned in time with a beginning of the second energy saving mode subpattern and with a first division of a time division duplexing format; and an end of the first energy saving mode subpattern is aligned in time with an end of the second energy saving mode subpattern and with a second division of a time division duplexing format.

Aspect 18: The method of aspect 17, wherein the beginning of the first energy saving mode subpattern and the beginning of the second energy saving mode subpattern are aligned with a first boundary of a time division duplexing format; and the end of the first energy saving mode subpattern and the end of the second energy saving mode subpattern are aligned with a second boundary of a time division duplexing format.

Aspect 19: The method of any of aspects 16 through 18, wherein the first control signaling indicates that the one or more respective first durations span each downlink slot of a subframe and the one or more respective second durations span each uplink slot of the subframe.

Aspect 20: The method of any of aspects 16 through 19, further comprising: transmitting an indication that one or more flexible slots of a subframe are designated as downlink slots, uplink slots, or any combination thereof; and wherein communicating the one or more data signals comprises communicating, during the one or more flexible slots, the one or more data signals in accordance with the first energy saving mode subpattern, the second energy saving mode subpattern, or both, based at least in part on the indication.

Aspect 21: The method of any of aspects 16 through 20, wherein the first energy saving mode subpattern is associated with a downlink transmission frequency band; and the second energy saving mode subpattern is associated with an uplink transmission frequency band.

Aspect 22: The method of any of aspects 14 through 21, wherein the energy saving mode pattern is to be used at the network entity for one of downlink transmissions or uplink transmissions.

Aspect 23: The method of any of aspects 14 through 22, further comprising: transmitting a configuration for a flexible energy saving mode identified in the energy saving mode pattern, wherein communicating the one or more data signals is in accordance with the flexible energy saving mode.

Aspect 24: The method of any of aspects 14 through 23, wherein each respective duration is equal to or greater than a minimum energy saving mode duration.

Aspect 25: The method of aspect 24, wherein the minimum energy saving mode duration is based at least in part on a subcarrier spacing.

Aspect 26: The method of any of aspects 14 through 25, wherein the one or more energy saving modes of a network entity are associated with one or more sleep modes of the network entity.

Aspect 27: An apparatus for wireless communications at a UE, comprising a processor; memory coupled with the processor; and instructions stored in the memory and executable by the processor to cause the apparatus to perform a method of any of aspects 1 through 13.

Aspect 28: An apparatus for wireless communications at a UE, comprising at least one means for performing a method of any of aspects 1 through 13.

Aspect 29: A non-transitory computer-readable medium storing code for wireless communications at a UE, the code comprising instructions executable by a processor to perform a method of any of aspects 1 through 13.

Aspect 30: An apparatus for wireless communications at a network entity, comprising a processor; memory coupled with the processor; and instructions stored in the memory and executable by the processor to cause the apparatus to perform a method of any of aspects 14 through 26.

Aspect 31: An apparatus for wireless communications at a network entity, comprising at least one means for performing a method of any of aspects 14 through 26.

Aspect 32: A non-transitory computer-readable medium storing code for wireless communications at a network entity, the code comprising instructions executable by a processor to perform a method of any of aspects 14 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (for example, receiving information), accessing (for example, accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
a processor; and
memory coupled with the processor and storing instructions executable by the processor to cause the apparatus to:
receive first control signaling indicating a network energy saving mode corresponding to a sequence of network energy saving modes and one or more respective durations over which the network entity is to operate in the network energy saving modes in accordance with the network energy saving mode pattern for transmissions in a plurality of slots, the network energy saving mode pattern based at least in part on one or more slot types of the plurality of slots;
receive second control signaling scheduling one or more data signals to be communicated between the UE and the network entity during a scheduled duration in one or more of the plurality of slots that at least partially overlaps with at least one of the one or more durations; and
communicate the one or more data signals during the scheduled duration in the one or more slots in accordance with the network energy saving mode pattern.

2. The apparatus of claim 1, wherein:
receiving the first control signaling comprises receiving a first network energy saving mode subpattern of one or more first network energy saving modes of the network energy saving modes and one or more respective first durations over which the network entity is to operate in the one or more first network energy saving modes for both uplink and downlink transmissions; and
communicating the one or more data signals comprises communicating the one or more data signals in accordance with the first network energy saving mode subpattern based at least in part on the one or more data signals being downlink signals, uplink signals, or any combination thereof.

3. The apparatus of claim 1, wherein:
receiving the first control signaling comprises:
receiving a first network energy saving mode subpattern of one or more first network energy saving modes of the network energy saving modes and one or more respective first durations over which the network entity is to operate in the one or more first network energy saving modes for downlink transmissions; and
receiving a second network energy saving mode subpattern of one or more second network energy saving modes of the network energy saving modes and one or more respective second durations over which the network entity is to operate in the one or more second network energy saving modes for uplink transmissions; and
communicating the one or more data signals comprises communicating the one or more data signals in accordance with the first network energy saving mode subpattern, the second network energy saving mode subpattern, or both, based at least in part on the one or more data signals being downlink signals, uplink signals, or any combination thereof.

4. The apparatus of claim 3, wherein:
a beginning of the first network energy saving mode subpattern is aligned in time with a beginning of the second network energy saving mode subpattern and with a first division of a time division duplexing format; and
an end of the first network energy saving mode subpattern is aligned in time with an end of the second network energy saving mode subpattern and with a second division of a time division duplexing format.

5. The apparatus of claim 4, wherein:
the beginning of the first network energy saving mode subpattern and the beginning of the second network energy saving mode subpattern are aligned with a first boundary of a time division duplexing format; and
the end of the first network energy saving mode subpattern and the end of the second network energy saving mode subpattern are aligned with a second boundary of a time division duplexing format.

6. The apparatus of claim 3, wherein the first control signaling indicates that the one or more respective first durations span each downlink slot of a subframe and the one or more respective second durations span each uplink slot of the subframe.

7. The apparatus of claim 3, wherein the instructions are further executable by the processor to cause the apparatus to:
receive an indication that one or more flexible slots of a subframe are designated as downlink slots, uplink slots, or any combination thereof;
wherein communicate the one or more data signals comprises communicating, during the one or more flexible slots, the one or more data signals in accordance with the first network energy saving mode subpattern, the second network energy saving mode subpattern, or both, based at least in part on the indication.

8. The apparatus of claim 3, wherein:
the first network energy saving mode subpattern is associated with a downlink transmission frequency band; and
the second network energy saving mode subpattern is associated with an uplink transmission frequency band.

9. The apparatus of claim 1, wherein the network energy saving mode pattern is to be used at the network entity for one of downlink transmissions or uplink transmissions.

10. The apparatus of claim 1, wherein the instructions are further executable by the processor to cause the apparatus to:
receive a configuration for a flexible network energy saving mode identified in the network energy saving mode pattern, wherein communicating the one or more data signals is in accordance with the flexible network energy saving mode.

11. The apparatus of claim 1, wherein each respective duration is equal to or greater than a minimum network energy saving mode duration.

12. The apparatus of claim 11, wherein the minimum network energy saving mode duration is based at least in part on a subcarrier spacing.

13. The apparatus of claim 1, wherein the network energy saving modes of the network entity are associated with one or more sleep modes of the network entity.

14. An apparatus for wireless communications at a network entity, comprising:
a processor; and
memory coupled with the processor and storing instructions executable by the processor to cause the apparatus to:
transmit first control signaling indicating a network energy saving mode pattern corresponding to a sequence of network energy saving modes and one or more respective durations over which the network entity is to operate in the network energy saving modes in accordance with the network energy saving mode pattern for transmissions in a plurality of slots, the network energy saving mode pattern based at least in part on one or more slot types of the plurality of slots;

transmit second control signaling scheduling one or more data signals to be communicated between a user equipment (UE) and the network entity during a scheduled duration in one or more of the plurality of slots that at least partially overlaps with at least one of the one or more durations; and communicate the one or more data signals during the scheduled duration in the one or more slots in accordance with the network energy saving mode pattern.

15. The apparatus of claim 14, wherein the instructions are further executable by the processor to cause the apparatus to:

transmit the first control signaling comprises receiving a first network energy saving mode subpattern of one or more first network energy saving modes of the network energy saving modes and one or more respective first durations over which the network entity is to operate in the one or more first network energy saving modes for both uplink and downlink transmissions; and communicate the one or more data signals comprises communicating the one or more data signals in accordance with the first network energy saving mode subpattern based at least in part on the one or more data signals being downlink signals, uplink signals, or any combination thereof.

16. The apparatus of claim 14, wherein:
transmitting the first control signaling comprises:
transmitting a first network energy saving mode subpattern of one or more first network energy saving modes of the network energy saving modes and one or more respective first durations over which the network entity is to operate in the one or more first network energy saving modes for downlink transmissions; and transmitting a second network energy saving mode subpattern of one or more second network energy saving modes of the network energy saving modes and one or more respective second durations over which the network entity is to operate in the one or more second network energy saving modes for uplink transmissions; and communicating the one or more data signals comprises communicating the one or more data signals in accordance with the first network energy saving mode subpattern, the second network energy saving mode subpattern, or both, based at least in part on the one or more data signals being downlink signals, uplink signals, or any combination thereof.

17. The apparatus of claim 16, wherein:
a beginning of the first network energy saving mode subpattern is aligned in time with a beginning of the second network energy saving mode subpattern and with a first division of a time division duplexing format; and an end of the first network energy saving mode subpattern is aligned in time with an end of the second network energy saving mode subpattern and with a second division of a time division duplexing format.

18. The apparatus of claim 17, wherein:
the beginning of the first network energy saving mode subpattern and the beginning of the second network energy saving mode subpattern are aligned with a first boundary of a time division duplexing format; and the end of the first network energy saving mode subpattern and the end of the second network energy saving mode subpattern are aligned with a second boundary of a time division duplexing format.

19. The apparatus of claim 16, wherein the first control signaling indicates that the one or more respective first durations span each downlink slot of a subframe and the one or more respective second durations span each uplink slot of the subframe.

20. The apparatus of claim 16, wherein the instructions are further executable by the processor to cause the apparatus to:

transmit an indication that one or more flexible slots of a subframe are designated as downlink slots, uplink slots, or any combination thereof;

wherein communicating the one or more data signals comprises communicating, during the one or more flexible slots, the one or more data signals in accordance with the first network energy saving mode subpattern, the second network energy saving mode subpattern, or both, based at least in part on the indication.

21. The apparatus of claim 16, wherein:
the first network energy saving mode subpattern is associated with a downlink transmission frequency band; and the second network energy saving mode subpattern is associated with an uplink transmission frequency band.

22. The apparatus of claim 14, wherein the network energy saving mode pattern is to be used at the network entity for one of downlink transmissions or uplink transmissions.

23. The apparatus of claim 14, wherein the instructions are further executable by the processor to cause the apparatus to:

transmit a configuration for a flexible network energy saving mode identified in the network energy saving mode pattern, wherein communicating the one or more data signals is in accordance with the flexible network energy saving mode.

24. The apparatus of claim 14, wherein each respective duration is equal to or greater than a minimum network energy saving mode duration.

25. The apparatus of claim 24, wherein the minimum network energy saving mode duration is based at least in part on a subcarrier spacing.

26. The apparatus of claim 14, wherein the network energy saving modes of the network entity are associated with one or more sleep modes of the network entity.

27. A method for wireless communications at a user equipment (UE), comprising:

receiving receive first control signaling indicating a network energy saving mode corresponding to a sequence of network energy saving modes and one or more respective durations over which the network entity is to operate in the network energy saving modes in accordance with the network energy saving mode pattern for transmissions in a plurality of slots, the network energy saving mode pattern based at least in part on one or more slot types of the plurality of slots;

receiving second control signaling scheduling one or more data signals to be communicated between the UE and the network entity during a scheduled duration in one or more of the plurality of slots that at least partially overlaps with at least one of the one or more durations; and communicating the one or more data signals during the scheduled duration in the one or more slots in accordance with the network energy saving mode pattern.

28. The method of claim 27, wherein:

receiving the first control signaling comprises:

receiving a first network energy saving mode subpattern of one or more first network energy saving modes of the energy saving modes and one or more respective first durations over which the network entity is to operate in the one or more first network energy saving modes for downlink transmissions; and receiving a second network energy saving mode subpattern of one or more second network energy saving modes of the energy saving modes and one or more respective second durations over which the network entity is to operate in the one or more second network energy saving modes for uplink transmissions; and communicating the one or more data signals comprises communicating the one or more data signals in accordance with the first network energy saving mode subpattern, the second network energy saving mode subpattern, or both, based at least in part on the one or more data signals being downlink signals, uplink signals, or any combination thereof.

29. A method for wireless communications at a network entity, comprising:

transmitting first control signaling indicating a network energy saving mode corresponding to a sequence of network energy saving modes and one or more respective durations over which the network entity is to operate in the network energy saving modes in accordance with the network energy saving mode pattern for transmissions in a plurality of slots, the network energy saving mode pattern based at least in part on one or more slot types of the plurality of slots;

transmitting second control signaling scheduling one or more data signals to be communicated between a user equipment (UE) and the network entity during a scheduled duration in one or more of the plurality of slots that at least partially overlaps with at least one of the one or more durations; and communicating the one or more data signals during the scheduled duration in the one or more slots in accordance with the network energy saving mode pattern.

30. The method of claim 29, wherein:

transmitting the first control signaling comprises:

transmitting a first network energy saving mode subpattern of one or more first network energy saving modes of the energy saving modes and one or more respective first durations over which the network entity is to operate in the one or more first network energy saving modes for downlink transmissions; and transmitting a second network energy saving mode subpattern of one or more second network energy saving modes of the energy saving modes and one or more respective second durations over which the network entity is to operate in the one or more second network energy saving modes for uplink transmissions; and communicating the one or more data signals comprises communicating the one or more data signals in accordance with the first network energy saving mode subpattern, the second network energy saving mode subpattern, or both, based at least in part on the one or more data signals being downlink signals, uplink signals, or any combination thereof.

* * * * *